(12) United States Patent
VanDerWege

(10) Patent No.: US 9,297,341 B2
(45) Date of Patent: Mar. 29, 2016

(54) MULTIPLE TAP ASPIRATOR WITH LEAK PASSAGE

(71) Applicant: Ford Global Technologies, LLC, Dearborn, MI (US)

(72) Inventor: Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/159,311

(22) Filed: Jan. 20, 2014

(65) Prior Publication Data

US 2015/0204283 A1   Jul. 23, 2015

(51) Int. Cl.
*F02M 35/10* (2006.01)

(52) U.S. Cl.
CPC ... *F02M 35/10144* (2013.01); *F02M 35/10157* (2013.01); *F02M 35/10222* (2013.01); *F02M 35/10229* (2013.01)

(58) Field of Classification Search
CPC .......... F02M 35/10118; F02M 35/10144; F02M 35/10157; F02M 35/10209; F02M 35/10229; F02M 35/10236; F02M 19/08; F01M 2013/027
USPC ............. 123/559.1, 564, 184.53, 184.54, 123/184.58, 184.59
See application file for complete search history.

(56) References Cited

U.S. PATENT DOCUMENTS

| 5,228,839 | A | 7/1993 | Peterson et al. |
| 6,582,199 | B1 | 6/2003 | Volkmann |
| 6,922,995 | B2 * | 8/2005 | Kawamura et al. ............. 60/608 |
| 7,627,407 | B2 * | 12/2009 | Hirooka ....................... 701/34.4 |
| 7,966,996 | B1 * | 6/2011 | Pursifull ....................... 123/518 |
| 8,297,263 | B2 * | 10/2012 | Pursifull ....................... 123/518 |
| 2005/0061378 | A1 | 3/2005 | Foret |
| 2013/0133870 | A1 | 5/2013 | Myers et al. |

FOREIGN PATENT DOCUMENTS

EP   0041055 A1   5/1981

OTHER PUBLICATIONS

Rodrigues, A. et al., "Venturi Tube Application to Improve the Vacuum Assistance for Brake Systems," SAE Technical Paper Series No. 2013-36-0019, 11 Colloqium Internacional SAE BRASIL de Freios & Mostra de Engenharia, Rio Grande do Sul, Brasil, May 15-17, 2013, 8 pages.
"Vacuum Generators", Gast Manufacturing, Inc., Benton Harbor, MI, Jul. 2012 Product Catalog, 21 pages.
(Continued)

*Primary Examiner* — Lindsay Low
*Assistant Examiner* — Grant Moubry
(74) *Attorney, Agent, or Firm* — Julia Voutyras; Alleman Hall McCoy Russell & Tuttle LLP

(57) ABSTRACT

Systems and methods are provided for engine systems including a multiple tap aspirator with a throat tap and a diffuser tap. Suction passages coupled to the throat and diffuser taps, respectively, may fluidly communicate via a leak passage with a flow restriction. During conditions where the pressure at a suction flow source of the diffuser tap is less than the pressure at the diffuser tap, backflow from the diffuser tap may travel through the leak passage into the throat tap.

6 Claims, 13 Drawing Sheets

(56) References Cited

OTHER PUBLICATIONS

Pursifull, Ross D. et al., "Multiple Tap Aspirator," U.S. Appl. No. 14/062,323, Filed Oct. 24, 2013, 53 pages.

Pursifull, Ross D., "Aspirator Motive Flow Control for Vacuum Generation and Compressor Bypass," U.S. Appl. No. 14/066,569, Filed Oct. 29, 2013, 65 pages.

* cited by examiner

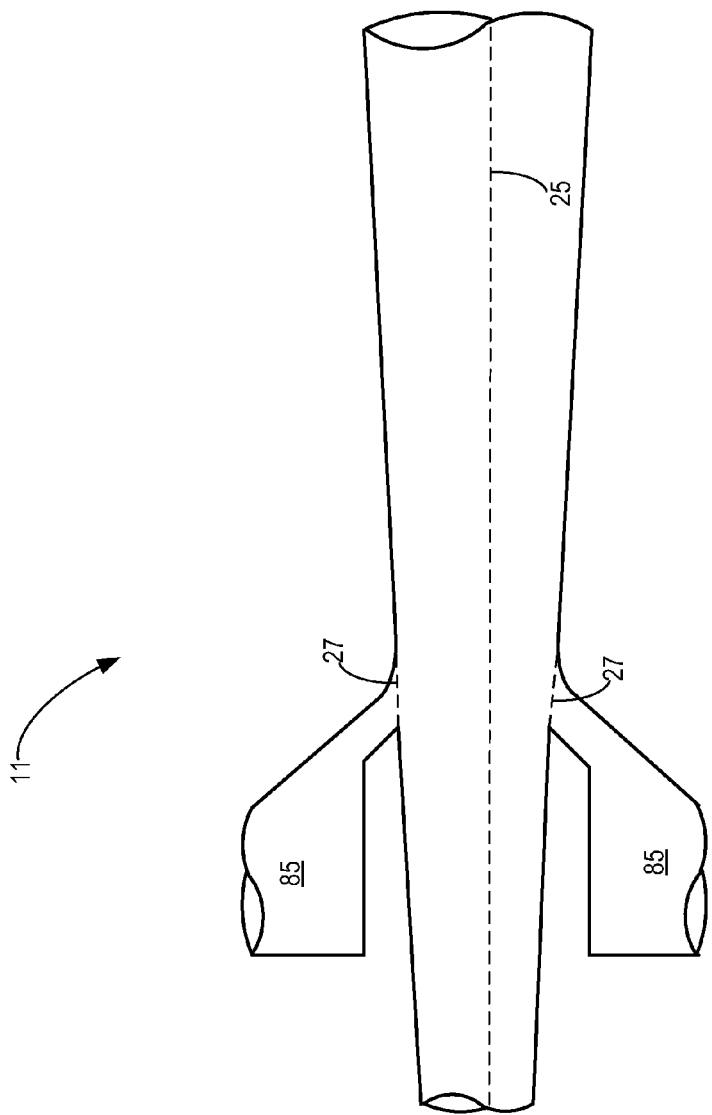

MULTIPLE TAP ASPIRATOR WITH LEAK PASSAGE

FIELD

The present application relates to an engine system incorporating a multiple tap aspirator which may generate vacuum and/or provide compressor recirculation flow, where flow separation at a diffuser tap of the aspirator is minimized via backflow into a leak passage coupling the diffuser tap with a throat tap of the aspirator.

BACKGROUND AND SUMMARY

Vehicle engine systems may include various vacuum consumption devices that are actuated using vacuum. These may include, for example, a brake booster. Vacuum used by these devices may be provided by a dedicated vacuum pump, such as an electrically-driven or engine-driven vacuum pump. As an alternative to such resource-consuming vacuum pumps, one or more aspirators may be coupled in an engine system to harness engine airflow for generation of vacuum. Aspirators (which may alternatively be referred to as ejectors, venturi pumps, jet pumps, and eductors) are passive devices which provide low-cost vacuum generation when utilized in engine systems. An amount of vacuum generated at an aspirator can be controlled by controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters.

Typically, aspirators are designed to maximize either vacuum generation or suction flow, but not both. Staged aspirators including multiple suction ports or taps may be used, but such aspirators tend to suffer from various disadvantages. For example, staged aspirators may rely on a motive flow of compressed air, and may not be usable in configurations where motive flow is intermittent (e.g., intermittent motive flow may result in vacuum reservoir vacuum loss in some examples). Further, aspirators with multiple suction taps may include one or more taps arranged in the diffuser/discharge cone of the aspirator, e.g., in the diverging portion of the aspirator downstream of the aspirator's throat. A suction tap arranged in the diffuser of an aspirator may act as an initiation site for flow separation, which may render the rest of the diffuser ineffective. Because obtaining a deep vacuum at the throat suction tap of an aspirator is highly dependent on the effectiveness of the diffuser, flow separation caused by any additional suction taps in the diffuser of an aspirator may significantly degrade the aspirator's ability to generate vacuum.

Furthermore, more efficient aspirators may be designed to allow a controlled introduction of suction flow as well as sufficient length for momentum transfer between the motive and suction flows upstream of the diffuser. These features may be difficult to incorporate for suction taps arranged in the diffuser of an aspirator, and thus may often disadvantageously be neglected in staged aspirators.

To address at least some of these issues, the inventors herein have identified a multiple tap aspirator with a design which reduces flow disruption caused by the suction tap in the diffuser and also maximizes forward flow of the diffuser suction tap. In one example, an engine system includes an aspirator, bypassing a compressor, a vacuum source coupled with throat and diffuser taps of the aspirator via respective first and second passages merging into a common passage downstream of the vacuum source, the first and second passages coupled by a leak passage with a flow restriction, a first check valve arranged in the common passage, and a second check valve arranged in the second passage upstream of the leak passage. An exit of the diffuser tap narrows as it approaches the diffuser, and the throat tap and a nozzle of the aspirator together form a converging annular suction flow path into the throat of the aspirator. During conditions when the pressure at the vacuum source is higher than the pressures at the diffuser tap and throat tap, there is forward flow from the vacuum source into both taps (assuming motive flow through the aspirator is present). While the pressure tends to be lower at the throat tap, the flow is restricted there due to the converging annular suction flow path into the throat formed by the throat tap and the nozzle, and thus the majority of the suction flow may advantageously enter the diffuser tap to provide extra suction flow as compared to a single-tap aspirator. Further, in some examples, the exit of the diffuser tap may be substantially parallel to the axis of the diffuser, such that the suction flow entering the diffuser tap is already traveling in the same direction as the motive flow through the diffuser, thereby reducing flow disruption at the diffuser tap.

In contrast, when the pressure at the vacuum source is lower than the pressure at the diffuser tap in the above example, a check valve closes and reverse flow into the diffuser tap ("backflow") may occur. A special technical effect achieved is that this backflow travels from the diffuser tap into the throat tap, which may advantageously produce an effect similar to bleed-gap or hybrid diffusers where the low-velocity boundary layer is sucked out of the diffuser tap, pulling the high-velocity flow near the wall and decreasing the likelihood of flow separation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2D shows a detail view of a diffuser of an aspirator which may be included in the aspirator arrangement of FIG. 2C.

DETAILED DESCRIPTION

Figure 1:
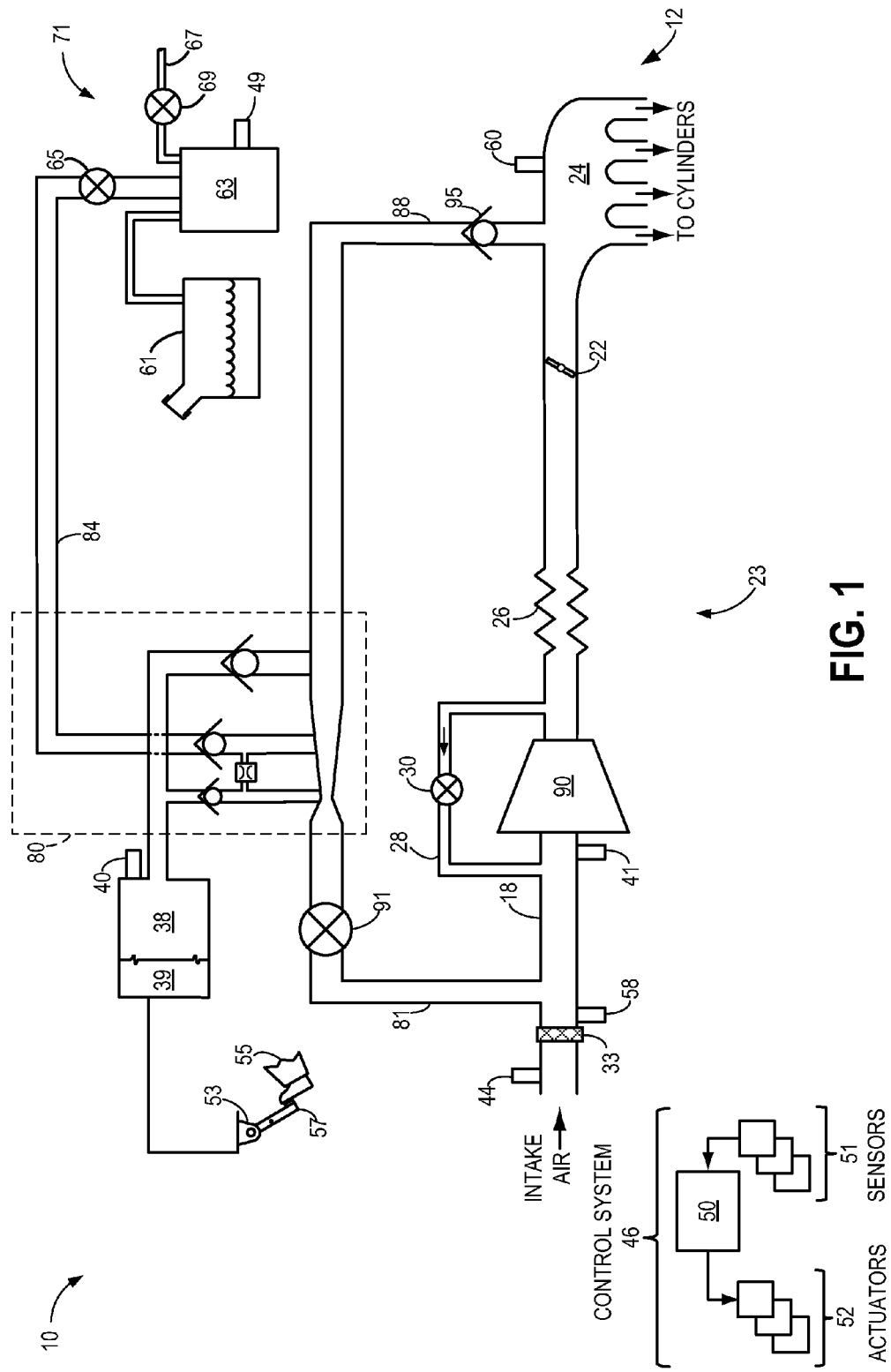
FIG. 1 shows a schematic diagram of a first embodiment of an engine system including an aspirator arrangement.

FIG. 1 shows an example engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 includes a control system 46. Control system 46 includes a controller 50, which may be any electronic control system of the engine system or of the vehicle in which the engine system is installed. Controller 50 may be configured to make control decisions based at least partly on input from one or more sensors 51 within the engine system, and may control actuators 52 based on the control decisions. For example, controller 50 may store computer-readable instructions in memory, and actuators 52 may be controlled via execution of the instructions.

Engine 12 has an engine intake system 23 that includes an air intake throttle 22 fluidly coupled to an engine intake manifold 24 along an intake passage 18. Air may enter intake passage 18 from an air intake system including an air cleaner 33 in communication with the vehicle's environment. A position of throttle 22 may be varied by controller 50 via a signal provided to an electric motor or actuator included with the throttle 22, a configuration that is commonly referred to as electronic throttle control. In this manner, the throttle 22 may be operated to vary the intake air provided to the intake manifold and the plurality of engine cylinders.

A barometric pressure (BP) sensor 44 may be coupled at an inlet of intake passage 18, e.g. upstream of the air filter, for providing a signal regarding barometric (e.g., atmospheric) pressure to controller 50. Additionally, a mass air flow (MAF) sensor 58 may be coupled in intake passage 18 just downstream of air cleaner 33 for providing a signal regarding mass air flow in the intake passage to controller 50. In other examples, MAF sensor 58 may be coupled elsewhere in the intake system or engine system, and further, there may be one or more additional MAF sensors arranged in the intake system or engine system. Further, a sensor 60 may be coupled to intake manifold 24 for providing a signal regarding manifold air pressure (MAP) and/or manifold vacuum (MANVAC) to controller 50. For example, sensor 60 may be a pressure sensor or a gauge sensor reading vacuum, and may transmit data as negative vacuum (e.g., pressure) to controller 50. In some examples, additional pressure/vacuum sensors may be coupled elsewhere in the engine system to provide signals regarding pressure/vacuum in other areas of the engine system to controller 50.

Engine system 10 may be a boosted engine system, where the engine system further includes a boosting device. In the present example, intake passage 18 includes a compressor 90 for boosting an intake air charge received along intake passage 18. A charge air cooler (or intercooler) 26 is coupled downstream of compressor 90 for cooling the boosted air charge before delivery to the intake manifold. In embodiments where the boosting device is a turbocharger, compressor 90 may be coupled to and driven by an exhaust turbine (not shown). Further, compressor 90 may be, at least in part, driven by an electric motor or the engine crankshaft.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This configuration enables boost control and surge control.

In the embodiment of FIG. 1, a compressor inlet pressure (CIP) sensor 41 is arranged downstream a junction of intake passage 18 and bypass passage 28, and upstream of the compressor. CIP sensor 41 may provide a signal regarding CIP to controller 50.

Engine system 10 further includes a fuel vapor purge system 71. Fuel vapor purge system 71 includes a fuel tank 61, which stores a volatile liquid fuel combusted in engine 12. To avoid emission of fuel vapors from the fuel tank and into the atmosphere, the fuel tank is vented to the atmosphere through adsorbent canister 63. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as will be described further herein. In the configuration shown in FIG. 1, canister purge valve 65 controls the purging of fuel vapors from the canister into the intake manifold along a suction passage 84 coupled to a suction tap arranged in a diffuser of a multiple tap aspirator, as will be described below. During conditions where motive flow through the aspirator is enabled and when vapor canister purging is desired, such as when the canister is saturated, vapors stored in fuel vapor canister 63 may be purged to intake manifold 24 by opening canister purge valve 65, as will be detailed herein.

While a single canister 63 is shown in fuel vapor purge system 71, it will be appreciated that any number of canisters may be included. In one example, canister purge valve 65 may be a solenoid valve wherein opening or closing of the valve is performed via actuation of a canister purge solenoid. Canister 63 further includes a vent 67 for routing gases out of the canister 63 to the atmosphere when storing, or trapping, fuel vapors from fuel tank 61. Vent 67 may also allow fresh air to be drawn into fuel vapor canister 63 when purging stored fuel vapors to intake manifold 24 via passage 84. While this example shows vent 67 communicating with fresh, unheated air, various modifications may also be used. Vent 67 may include a canister vent valve 69 to adjust a flow of air and vapors between canister 63 and the atmosphere. As shown, a pressure sensor 49 may be arranged in canister 63 to provide a signal regarding the pressure in the canister to controller 50. In other examples, pressure sensor 49 may be arranged elsewhere, for example in passage 84.

Engine system 10 further includes an aspirator arrangement 80. Aspirator arrangement 80 includes an aspirator 54 which may be an ejector, aspirator, eductor, venturi, jet pump, or similar passive device. As shown in the detail view of aspirator arrangement 80 in FIG. 2A, aspirator 54 includes a motive inlet 45, a mixed flow outlet 47, and at least three suction taps. In the depicted embodiment, exactly three suction taps are shown: a tap at a throat 77 of the aspirator ("throat tap") 83, a tap in a diverging cone or diffuser of the aspirator ("diffuser tap") 85, and a tap in an exit tube of the aspirator ("exit tube tap") 87. Motive flow through the aspirator may generate suction flow at one or more of the suction taps depending on pressure levels within the system, thereby generating vacuum which may be stored in a vacuum reservoir and/or directly provided to various vacuum consumers of the engine system.

As shown in FIG. 1, a passage 81 couples motive inlet 45 of aspirator arrangement 80 with intake passage 18 near an inlet of the intake passage, downstream of air filter 33. In other examples, passage 81 may couple the motive inlet of aspirator arrangement 80 with the intake passage at another portion, or alternatively, passage 81 may lead directly to atmosphere instead of being coupled to the intake passage. Further, in the depicted embodiment, a passage 88 couples mixed flow outlet 47 of aspirator arrangement 80 with intake manifold 24. However, in other embodiments, passage 88 may couple the mixed flow outlet of aspirator arrangement 80 with another portion of the engine system which can serve as a vacuum source (e.g., a portion of the engine system with a level of vacuum deeper than 0.1 bar).

In the depicted example, a check valve 95 arranged in passage 88 prevents backflow from the intake manifold to the intake passage via aspirator arrangement 80, which may for example otherwise occur during boost when MAP is greater than BP. However, it will be appreciated that in other examples, aspirator 54 may be designed with a flow geometry that maximizes vacuum generation for bidirectional flow, and thus it may not be desirable to restrict reverse flow using a check valve such as check valve 95. In still further examples, an aspirator shut-off valve (ASOV) arranged in series with aspirator 54 may be controlled based on pressure differentials within the engine system such that backflow cannot occur (e.g., an ASOV may be closed during boost conditions), and check valve 95 may be either included to provide redundancy or omitted.

Figure 2A:
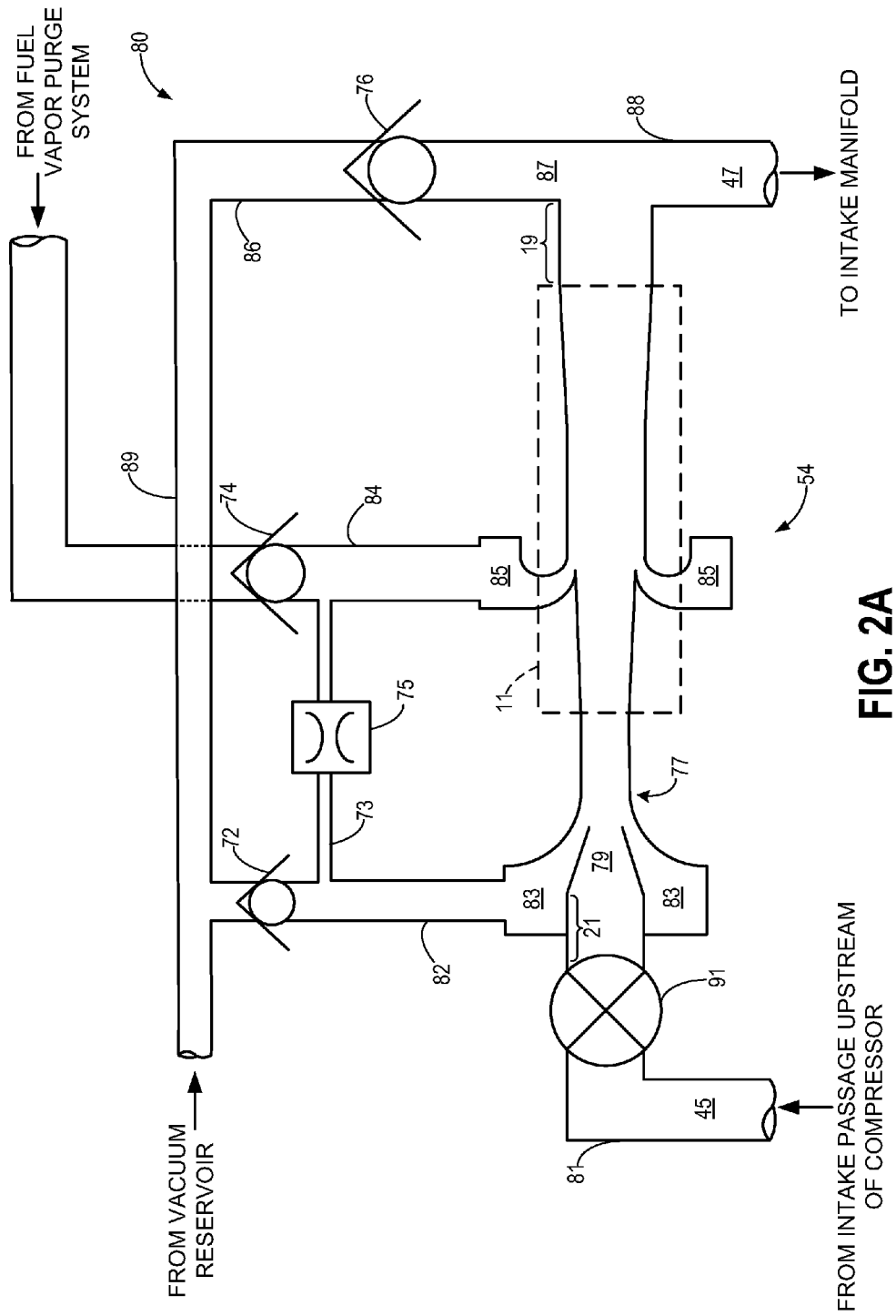
FIG. 2A shows a detail view of an aspirator arrangement which may be included in an engine system such as the engine system of the first embodiment.

Each suction tap of the aspirator has a corresponding passage. As shown in FIG. 2A, a suction passage 82 couples tap 83 of aspirator 54 with common passage 89, a suction passage 84 couples tap 85 with fuel vapor purge system 71, and a suction passage 86 couples tap 87 with common passage 89, such that suction passages 82 and 86 effectively merge to form common passage 89. In the depicted example, the suction passages have different dimensions; that is, suction passage 82 is smaller than suction passage 84, and suction passage 84 is smaller than suction passage 86. As detailed below, such an arrangement may be appropriate as the amount of peak suction flow occurring through suction passage 82 may be smaller than the amount of suction flow occurring through suction passage 84, which may in turn be smaller than the amount of suction flow occurring through passage 86.

In the first embodiment, no check valves are arranged in common passage 89. Instead, a check valve is arranged in each of suction passages 82 and 86 upstream of a juncture of these passages with common passage 89. Specifically, a check valve 72 is arranged in suction passage 82, and a check valve 76 is arranged in suction passage 86. Further, a check valve 74 is arranged in suction passage 84. While the depicted embodiment shows the check valves as distinct valves, in alternate embodiments, each check valve may be integrated into the aspirator, for example proximal to the corresponding suction tap. Whereas known multiple tap aspirators may require suction flow to pass through multiple check valves (e.g., multiple check valves arranged in series or arranged in a common passage between the junctures of suction passages with the common passage), the depicted arrangement advantageously requires suction flow to pass through only a single check valve as it travels from a source of suction flow to the aspirator via one of the suction passages, thereby reducing flow losses which may result from flow through multiple check valves. The check valve arranged in each suction passage prevents backflow from aspirator 54 to the source of suction flow. Because mixed flow outlet 47 of aspirator arrangement 80 communicates with intake manifold 24 in the first embodiment, check valves 72, 74, and 76 prevent reverse flow from the intake manifold, e.g. which might otherwise occur during conditions when intake manifold pressure is higher than pressure at the suction flow source(s). Similarly, check valves 72, 74, and 76 help to prevent fluid such as an intake air charge from flowing from passage 81 into the suction flow source(s).

As may be seen in FIG. 1, suction taps 83 and 87 of aspirator 54 communicate with a vacuum reservoir 38 by way of common passage 89. Vacuum reservoir 38 may provide vacuum to one or more vacuum actuators 39 of the engine system. In one non-limiting example, vacuum actuators 39 may include a brake booster coupled to vehicle wheel brakes wherein vacuum reservoir 38 is a vacuum cavity in front of a diaphragm of the brake booster, as shown in FIG. 1. In such an example, vacuum reservoir 38 may be an internal vacuum reservoir configured to amplify a force provided by a vehicle operator 55 via a brake pedal 57 for applying vehicle wheel brakes (not shown). A position of the brake pedal 57 may be monitored by a brake pedal sensor 53. In alternate embodiments, the vacuum reservoir may be a low pressure storage tank included in a fuel vapor purge system, a vacuum reservoir coupled to a turbine wastegate, a vacuum reservoir coupled to a charge motion control valve, etc. In such embodiments, vacuum consumption devices 39 of the vehicle system may include various vacuum-actuated valves such as charge motion control valves, a 4×4 hub lock, switchable engine mounts, heating, ventilation and cooling, vacuum leak checks, crankcase ventilation, exhaust gas recirculation, gaseous fuel systems, compressor bypass valves (e.g., CBV 30 shown in FIG. 1), wheel-to-axle disconnect, etc. In one example embodiment, anticipated vacuum consumption by the vacuum consumers during various engine operating conditions may be stored in a lookup table in memory of the control system, for example, and the stored vacuum threshold corresponding to anticipated vacuum consumption for current engine operating conditions may be determined by referencing the lookup table. In some embodiments, as depicted, a sensor 40 may be coupled to the vacuum reservoir 38 for providing an estimate of the vacuum level at the reservoir. Sensor 40 may be a gauge sensor reading vacuum, and may transmit data as negative vacuum (e.g., pressure) to controller 50. Accordingly, sensor 40 may measure the amount of vacuum stored in vacuum reservoir 38.

In FIG. 2A, a schematic cross-sectional view of aspirator 54 is provided. Aspirator 54 begins with a constant-diameter (straight tube) portion 21 immediately upstream of and contiguous with a nozzle 79. Nozzle 79 has a converging, frustoconical flow geometry, so as to reduce the pressure and increase the velocity of fluid entering aspirator 54 via motive inlet 45.

As may be seen in FIG. 2A, passages 82 and 84 are fluidly coupled upstream of check valves 72 and 74 by a leak passage 73 comprising a flow restriction 75. In some examples, flow restriction 75 may be an orifice, such as a 0.8 mm diameter sharp-edged orifice. Such an orifice may enable recirculation of approximately 3% of the flow passing through the diffuser back into the upstream throat tap via the leak passage. Depending on the extent of flow restriction provided by flow restriction 75, in one non-limiting example, a pressure of fluid may need to exceed a threshold in order for the fluid to pass through the flow restriction. During conditions where the pressure at the suction flow source for the diffuser suction tap (suction tap 85) is lower than the pressure at suction tap 85, check valve 74 closes, preventing backflow from suction tap 85 into the suction flow source. However, some backflow may be enabled via leak passage 73.

For example, because the pressure at the throat suction tap (suction tap 83) is typically lower than the pressure at the diffuser suction tap (suction tap 85) due to the geometry of the aspirator and the venturi effect, fluid may flow from suction tap 85 into passage 84, then into leak passage 73, then into passage 82, and then into suction tap 83 where it enters the throat of the aspirator. This leakage flow may produce an effect similar to that of bleed-gap or hybrid diffusers where the low-velocity boundary layer is sucked out of the diffuser, pulling the high-velocity flow near the wall and advantageously decreasing the likelihood of flow separation. In other examples, rather than fluidly coupling passages 82 and 84, leak passage 73 may fluidly couple passage 84, upstream of check valve 74, with another component of the engine system (e.g., common passage 89, passage 84 downstream of check valve 74, etc.).

As shown in FIG. 2A, part of the upstream constant-diameter portion 21 of the aspirator and the entire nozzle are surrounded by suction tap 83 (e.g., these elements are disposed within suction tap 83). In one non-limiting example, suction tap 83 comprises an upstream annular portion, which appears rectangular in cross-section, joined to a bell-shaped downstream portion. A diameter of a base of the bell-shaped portion may be equal to a height of the cross-section of the rectangular portion; after the base, the bell-shaped portion may taper until it forms a straight tube with a constant diameter, thereby forming throat 77 of aspirator 54.

Because nozzle 79 is surrounded by suction tap 83, a converging annular flow path is formed by the bell-shaped portion of suction tap 83 and nozzle 79. That is, as may be seen in the cross-sectional view provided in FIG. 2A, a distance between the converging concave sides of the bell-shaped portion and the frustoconical converging nozzle (e.g., a difference between a diameter of the bell-shaped portion and a diameter of the frustoconical converging nozzle) decreases as the portions approach each another. Accordingly, suction flow into aspirator 54 via suction tap 83 is accelerated due to the decreasing diameter of the annular flow path formed between the suction tap and the nozzle as suction flow approaches throat 77. Due to this acceleration, suction flow may advantageously enter the aspirator at a velocity closer to the velocity of the motive flow exiting the nozzle of the aspirator.

A narrowest-diameter end of the bell-shaped portion of suction tap 83 is contiguous with a portion of aspirator 54, which forms throat 77 of aspirator 54. While the portion of the aspirator contiguous with the narrowest-diameter end of the bell-shaped portion of suction tap 83 is a straight-tube (e.g. constant diameter) portion, in other non-limiting examples, this portion of the aspirator may have a converging or diverging geometry. Downstream of and contiguous with this portion is a diverging cone or diffuser, which will be referred to herein as a diffuser 11 of aspirator 54. As shown in the detail view of diffuser 11 in FIG. 2B, diffuser 11 may comprise an first diverging portion 13, a first constant-diameter (e.g., straight-tube) portion 15 contiguous with and downstream of first diverging portion 13, and a second diverging portion 17 contiguous with and downstream of first constant-diameter portion 15. The existence of the first constant-diameter portion 15 may represent a compromise between the effectiveness of the throat tap and the diffuser tap; e.g., first constant-diameter portion 15 may increase the effectiveness of the diffuser tap while slightly decreasing the effectiveness of the throat tap.

Dashed line 25 represents an axis of diffuser 11, whereas dashed lines 27 represent a continuation of the angle of divergence of first diverging portion 13. It will be appreciated that an angle of divergence refers to an angle between the slope of a side of a diverging portion and any horizontal line which is parallel to the axis of the diffuser and which intersects a side of the diverging portion. As shown, first constant-diameter portion 15 begins at a downstream side of suction tap 85, and extends to a point where it converges with dashed lines 27 in the cross-sectional view of FIG. 2B (where it meets the angle of first diverging portion 13).

Returning to FIG. 2A, a second constant-diameter portion 19 of aspirator 54 is disposed downstream of diffuser 11. Second constant-diameter portion 19, which may alternatively be referred to as an exit tube of aspirator 54, is contiguous with and downstream of second diverging portion 17 of diffuser 11.

Due to the converging-diverging shape of aspirator 54, the flow of atmospheric air from motive inlet 45 to mixed flow outlet 47 of aspirator 54 may generate a low pressure at one or more of suction taps 83 and 85 of the aspirator, depending on relative pressures/vacuum levels at the mixed motive inlet and the mixed flow outlet of aspirator 54. This low pressure may induce suction flow from common passage 89 into suction tap 83, thereby generating vacuum at the suction flow source coupled to that tap (e.g., vacuum reservoir 38 in the embodiment of FIG. 1), and/or may induce suction flow from passage 84 into suction tap 85, thereby generating vacuum at the suction flow source coupled to that tap (e.g., fuel vapor purge system 71 in the embodiment of FIG. 1). In contrast to suction taps 83 and 85, suction tap 87 is coupled downstream of aspirator 54, in a constant-diameter passage. Suction tap 87 may be coupled to passage 88 anywhere downstream of aspirator 54 and upstream of the mixed flow outlet of the aspirator (e.g., upstream of the intake manifold in the embodiment in FIG. 1). In other examples, suction tap 87 may be coupled to second constant-diameter portion 19 of aspirator 54. Because suction tap 87 is coupled to a constant-diameter passage, full pressure recovery of the motive fluid flowing through the aspirator may occur before the fluid passes suction tap 87, and therefore fluid flow from the suction flow source into suction tap 87 may not contribute to vacuum generation. However, this fluid flow may advantageously provide a direct path for a high volume of flow from the suction flow source (e.g., the vacuum reservoir in the embodiment of FIG. 1) to mixed flow outlet of the aspirator (e.g., the intake manifold in the embodiment of FIG. 1). In the embodiment of FIG. 1, common passage 89 couples suction tap 87 to the vacuum reservoir as noted above.

Because suction tap 83 is arranged at throat 77 of aspirator 54, which is the portion of the aspirator with the smallest cross-sectional flow area, the venturi effect is strongest at suction tap 83 and thus more vacuum may be generated at suction tap 83 as compared to suction tap 85, which is arranged in the diffuser of aspirator 54 and therefore is arranged at a portion of the aspirator with a larger cross-sectional flow area. However, a smaller suction flow (e.g., flow rate or level) may occur via suction tap 83, whereas a larger suction flow may occur via suction tap 85.

Because aspirator 54 comprises multiple suction taps, it may achieve the different advantages associated with placing a suction tap at different parts of the aspirator. For example, deep vacuum but small flow may be achieved via the throat suction tap 83, shallow vacuum but high flow may be achieved via the diffuser suction tap 85, and no vacuum enhancement but very high flow may be achieved via the exit tube tap 87. Further, in contrast to known multiple tap aspirators such as Gast vacuum generators which must be coupled between a high pressure source and a low pressure sink (e.g., between a compressed air source at 5 bar and atmosphere at 0 bar), aspirator 54 is designed such that it may be coupled between a source with a pressure at or near atmospheric pressure and a lower pressure source (e.g., it may receive atmospheric air at its motive inlet and deliver mixed flow to a sink with vacuum deeper than 0.1 bar such as the intake manifold).

In some examples, aspirator 54 may operate passively, e.g., whether motive flow passes through aspirator 54 may depend upon pressures within engine system 10 and other engine operating parameters without any active control performed by the control system. However, in the embodiment of FIG. 1, an aspirator shut-off valve (ASOV) 91 is actively controlled to allow/disallow motive flow through the aspirator (in the case of a binary ASOV) or to reduce/increase flow through the aspirator (in the case of a continuously variable ASOV). As shown, ASOV 91 is arranged in passage 81 upstream of constant-diameter portion 21 of aspirator 54; in other embodiments, the ASOV may be arranged on a downstream side of aspirator 54 (e.g., downstream of second constant-diameter portion 19), or the ASOV may be integral to the aspirator (e.g., the valve may be arranged at the throat of the aspirator). One advantage of positioning the ASOV upstream of the aspirator is that when the ASOV is upstream, the pressure loss associated with the ASOV may have less of an impact as compared to configurations where the ASOV is downstream of the aspirator or where the ASOV is integral to the aspirator.

ASOV 91 may be a solenoid valve which is actuated electrically, and its state may be controlled by controller 50 based on various engine operating conditions. However, as an alternative, the ASOV may be a pneumatic (e.g., vacuum-actuated) valve; in this case, the actuating vacuum for the valve may be sourced from the intake manifold and/or vacuum reservoir and/or other low pressure sinks of the engine system. In embodiments where the ASOV is a pneumatically-controlled valve, control of the ASOV may be performed independent of a powertrain control module (e.g., the ASOV may be passively controlled based on pressure/vacuum levels within the engine system).

Whether it is actuated electrically or with vacuum, ASOV 91 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable ASOV may provide greater flexibility in control of the motive flow through the aspirator, with the drawback that continuously variable valves may be much more costly than binary valves.

In other examples, ASOV 91 may be a gate valve, pivoting plate valve, poppet valve, or another suitable type of valve.

Figure 2B:
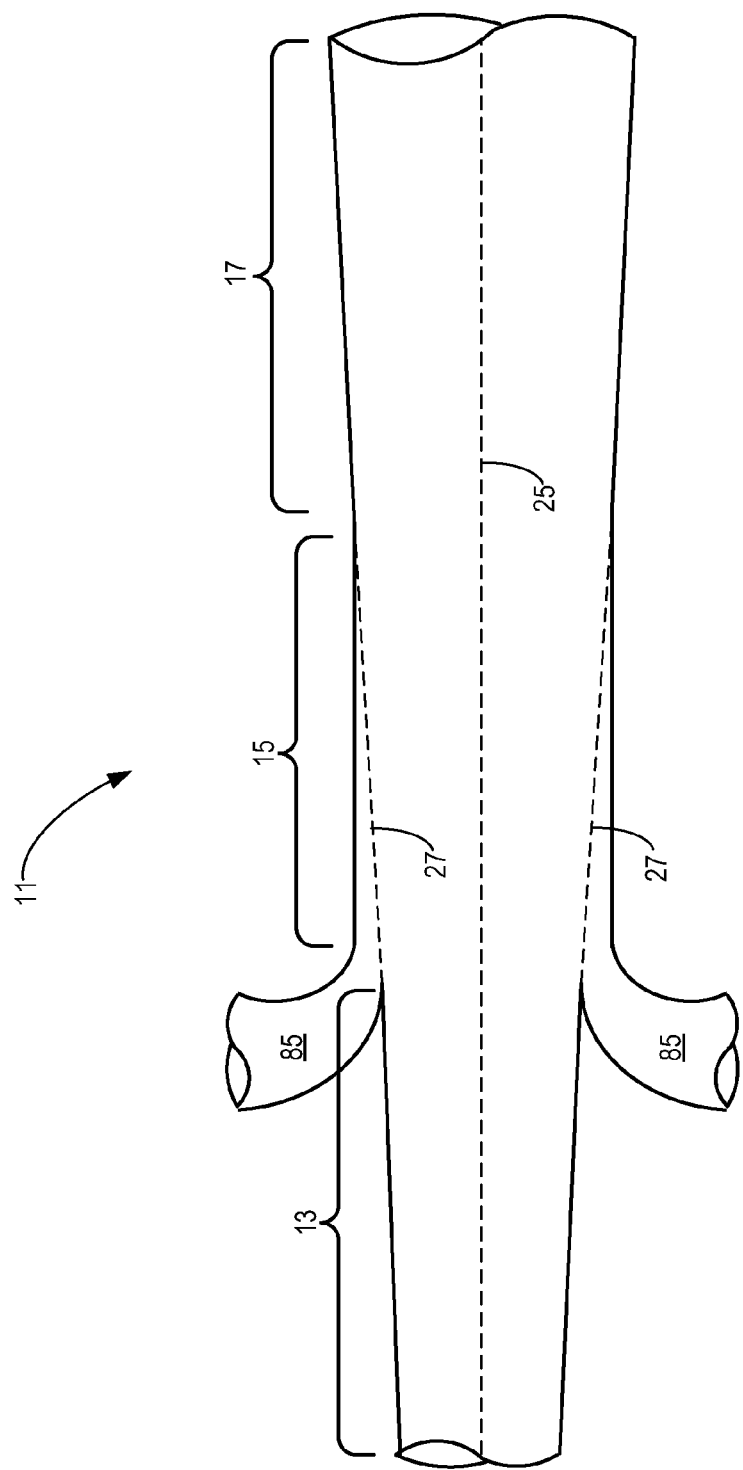
FIG. 2B shows a detail view of a diffuser of an aspirator which may be included in the aspirator arrangement of FIG. 2A.
Figure 2C:
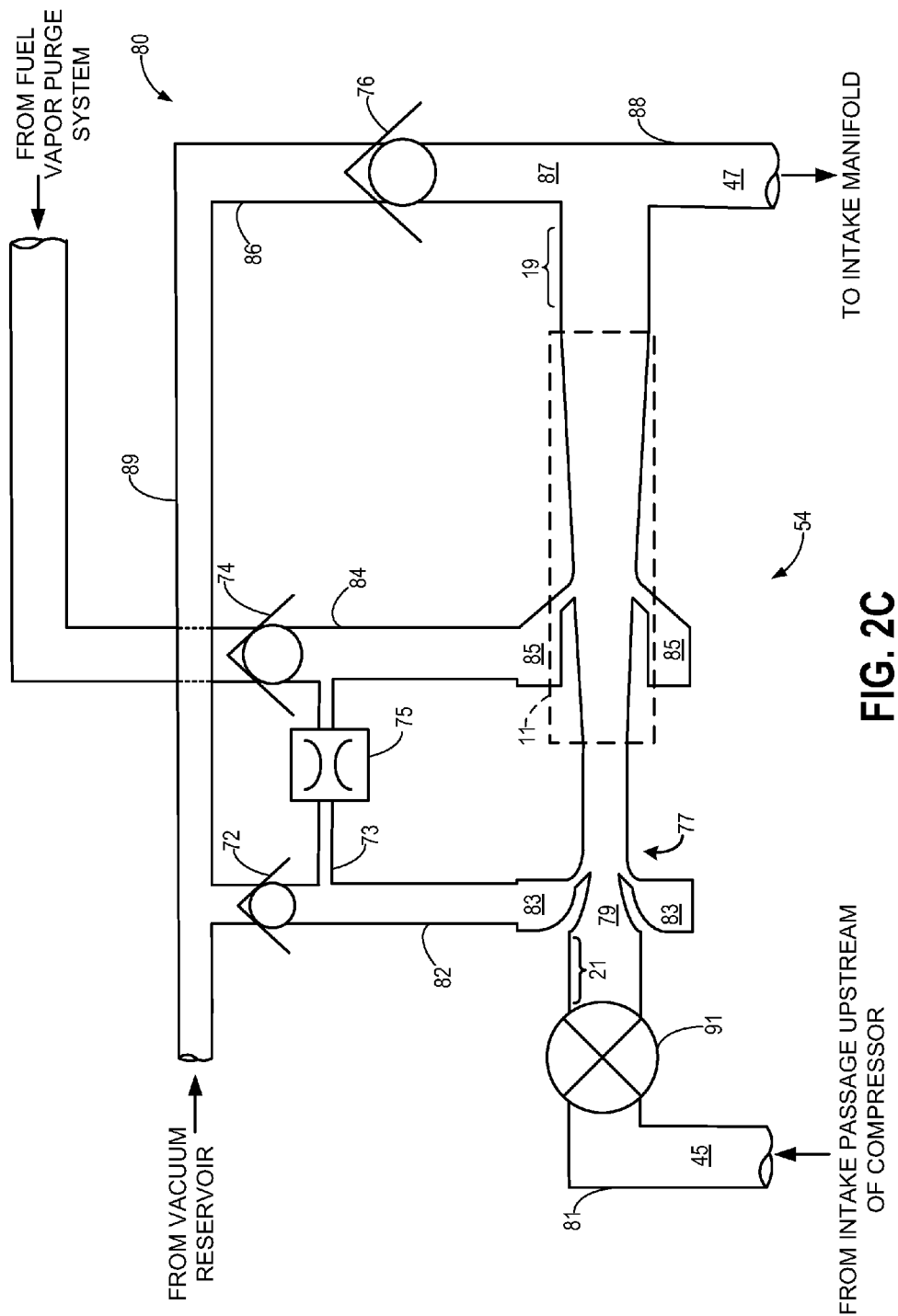
FIG. 2C shows another detail view of an aspirator arrangement which may be included in an engine system such as the engine system of the first embodiment.

In FIG. 2C, a schematic cross-sectional view of an alternative aspirator arrangement is provided. The alternative aspirator arrangement of FIG. 2C includes many of the same features described above for the aspirator arrangement of FIG. 2A; similar features are numbered similarly and will not be described again for the sake of brevity.

In contrast to nozzle 79 of FIG. 2A, nozzle 79 of FIG. 2C has a converging, frustoconical flow geometry with concave sides. This flow geometry may provide enhanced pressure reduction and enhanced velocity increase of fluid entering aspirator 54 via motive inlet 45 relative to the flow geometry of nozzle 79 of FIG. 2A, which has non-concave sides.

Further, in contrast to suction tap 83 of FIG. 2A, suction tap 83 of FIG. 2C may have a different flow geometry. When viewed in cross-section, the upstream outer surface of suction tap 83 of FIG. 2C (with respect to aspirator motive flow) is formed as a convex curve, with an angled portion contiguous with a bottom downstream side of the curve and continuing until it joins with the downstream side of nozzle 79. It will be appreciated that when not viewed in cross-section, this angled portion may constitute a frustoconical section. As for the downstream outer surface of suction tap 83, when viewed in cross section, it appears as a straight line parallel to a suction flow axis of passage 82. A concave curved surface is contiguous with the bottom of this straight surface at its upstream side, and contiguous with the throat of the aspirator at its downstream side. A converging flow path is thus formed between the angled portion and the concave curved portion of suction tap 83. Suction flow enters the aspirator via this converging flow path of the diffuser tap at an angle of approximately 45 degrees from an axis of the diffuser. Whereas the flow path from suction tap 83 into the throat of the aspirator shown in FIG. 2A may be problematic for smaller-sized implementations of the aspirator arrangement, where the thickness of the nozzle may become a significant factor, the flow path from suction tap 83 into the throat of the aspirator shown in FIG. 2C is not dependent on nozzle thickness as it is formed between two sides of the tap itself rather than between the nozzle and the side of the tap (while still advantageously accelerating the suction flow, e.g. such that it enters the aspirator at a velocity closer to the velocity of the motive flow exiting the nozzle of the aspirator).

Figure 9A:
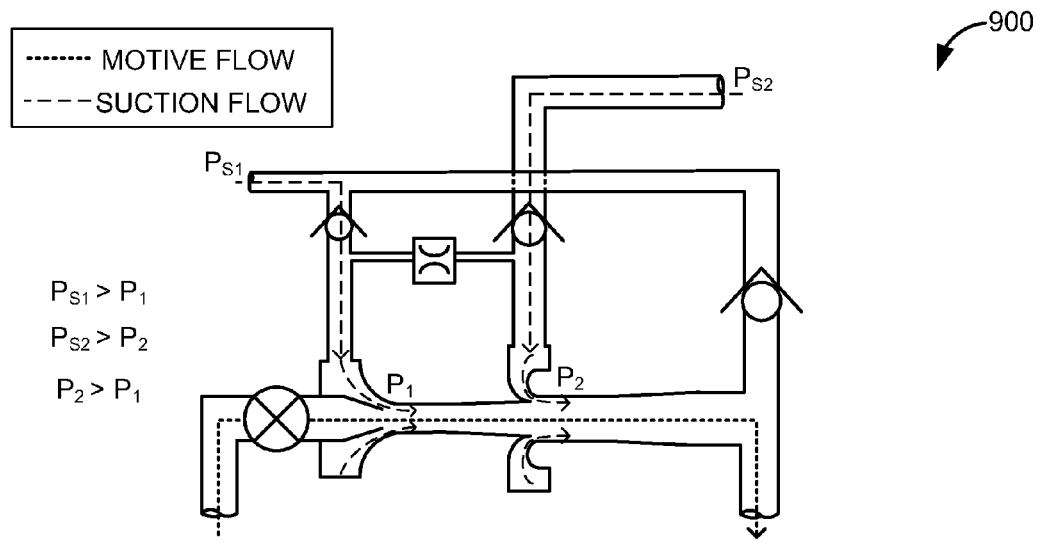
FIG. 9A depicts motive and suction flows through an aspirator arrangement which may correspond to the aspirator arrangement of FIGS. 1-2A during a first condition.
Figure 9B:
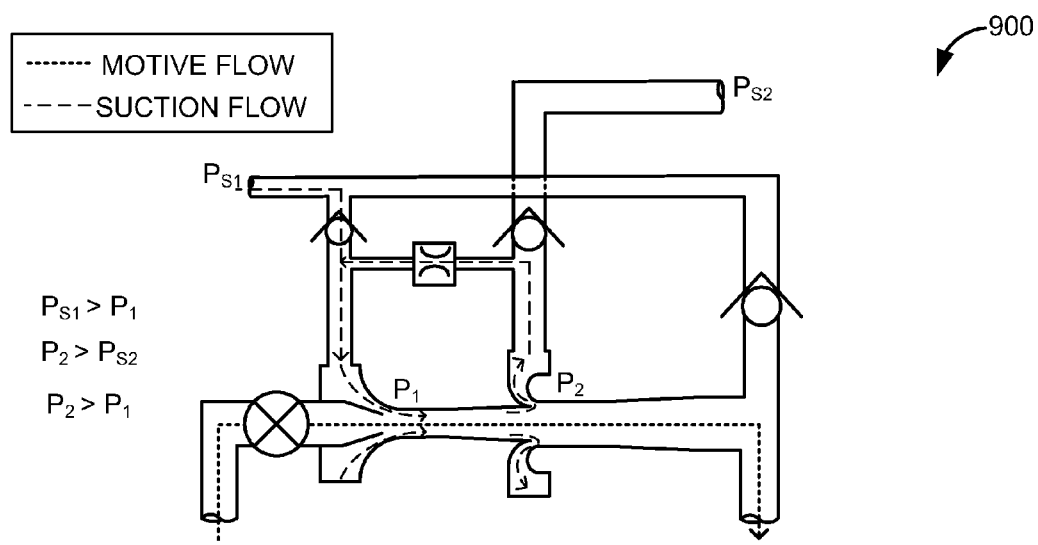
FIG. 9B depicts motive and suction flows through an aspirator arrangement which may correspond to the aspirator arrangement of FIGS. 1-2A during a second condition.

In contrast to diffuser 11 of the aspirator shown in FIGS. 2A-B, diffuser 11 of FIGS. 2C-D may have a diverging flow geometry along its entire length, such that it lacks a constant-diameter portion such as first constant-diameter portion 15 of FIG. 2B. As shown, the sides of the diffuser diverge at a constant angle of divergence (the angle between dashed line 25 and each of dashed lines 27). Accordingly, whereas the diffuser shown in FIG. 2B is designed such that the effectiveness of the diffuser tap is prioritized over the effectiveness of the throat tap, the diffuser shown in FIG. 2D is designed such that the effectiveness of the throat tap is prioritized over the effectiveness of the diffuser tap. Turning to FIGS. 9A-B, they depict an aspirator arrangement 900 which may correspond to aspirator arrangement 80 of the first embodiment. These figures depict suction and motive flow through aspirator arrangement 900 for different system pressure levels when the ASOV is open, when the CPV of the fuel vapor purge system is open, and when forward motive flow is traveling through the aspirator (e.g., when BP is greater than MAP).

FIG. 9A depicts suction and motive flow through aspirator arrangement 900 during engine operating conditions wherein the pressure $P_{S1}$ at the suction flow source of the throat and exit tube taps (e.g., the pressure at the vacuum reservoir in the first embodiment) is greater than the pressure $P_1$ at the throat tap, and wherein the pressure $P_{S2}$ at the suction flow source of the diffuser tap (e.g., the pressure at the outlet of the fuel vapor purge system in the first embodiment) is greater than the pressure $P_2$ at the diffuser tap. As indicated, due to the geometry of the aspirator, $P_1$ may be less than $P_2$. During these conditions, as shown, suction flow from the vacuum reservoir may enter the throat tap, and suction flow from the fuel vapor purge system may enter the diffuser tap. While not depicted in FIG. 9A, it will be appreciated that fluid may also flow from the vacuum reservoir into the exit tube tap during these conditions depending on the pressure differential between the vacuum reservoir and the intake manifold.

In contrast, FIG. 9B depicts suction and motive flow through aspirator arrangement 900 during engine operating conditions wherein the pressure $P_{S1}$ at the suction flow source of the throat and exit tube taps (e.g., the pressure at the vacuum reservoir in the first embodiment) is greater than the pressure $P_1$ at the throat tap, and wherein the pressure $P_{S2}$ at the suction flow source of the diffuser tap (e.g., the pressure at the outlet of the fuel vapor purge system in the first embodiment) is less than the pressure $P_2$ at the diffuser tap. As indicated, due to the geometry of the aspirator, $P_1$ may be less than $P_2$. During these conditions, as shown, suction flow from the vacuum reservoir may enter the throat tap. However, because $P_2$ is greater than $P_{S2}$, the check valve in the suction passage coupled to the diffuser tap closes, such that suction flow from the fuel vapor purge system cannot enter the diffuser tap. As shown, at the diffuser tap, a low-velocity boundary layer of the motive flow may be sucked out of the diffuser at the diffuser tap, for example because $P_1$ is less than $P_2$. After being sucked out of the diffuser at the diffuser tap, the flow enters the suction passage coupled to the diffuser, then flows into the leak passage, and then into the throat tap of the aspirator, as shown. Advantageously, the sucking out of the low-velocity boundary layer may result in high-velocity motive flow being pulled near the wall of the aspirator which may in turn decrease the likelihood of flow separation in the region of the diffuser tap.

While not depicted in FIG. 9B, it will be appreciated that fluid may also flow from the vacuum reservoir into the exit tube tap during these conditions depending on the pressure differential between the vacuum reservoir and the intake manifold.

Figure 3:
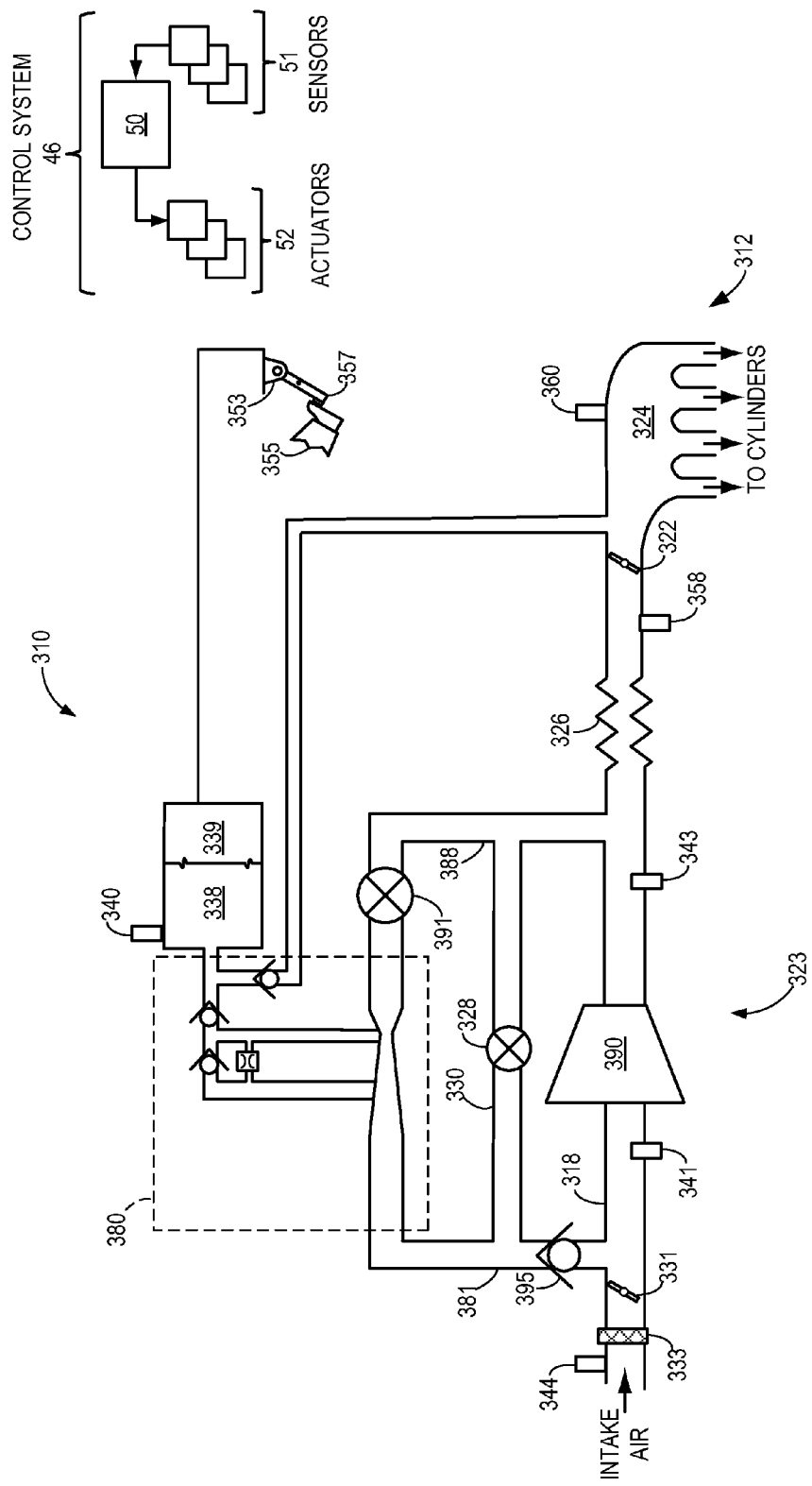
FIG. 3 shows a schematic diagram of a second embodiment of an engine system including an aspirator arrangement.
Figure 4:
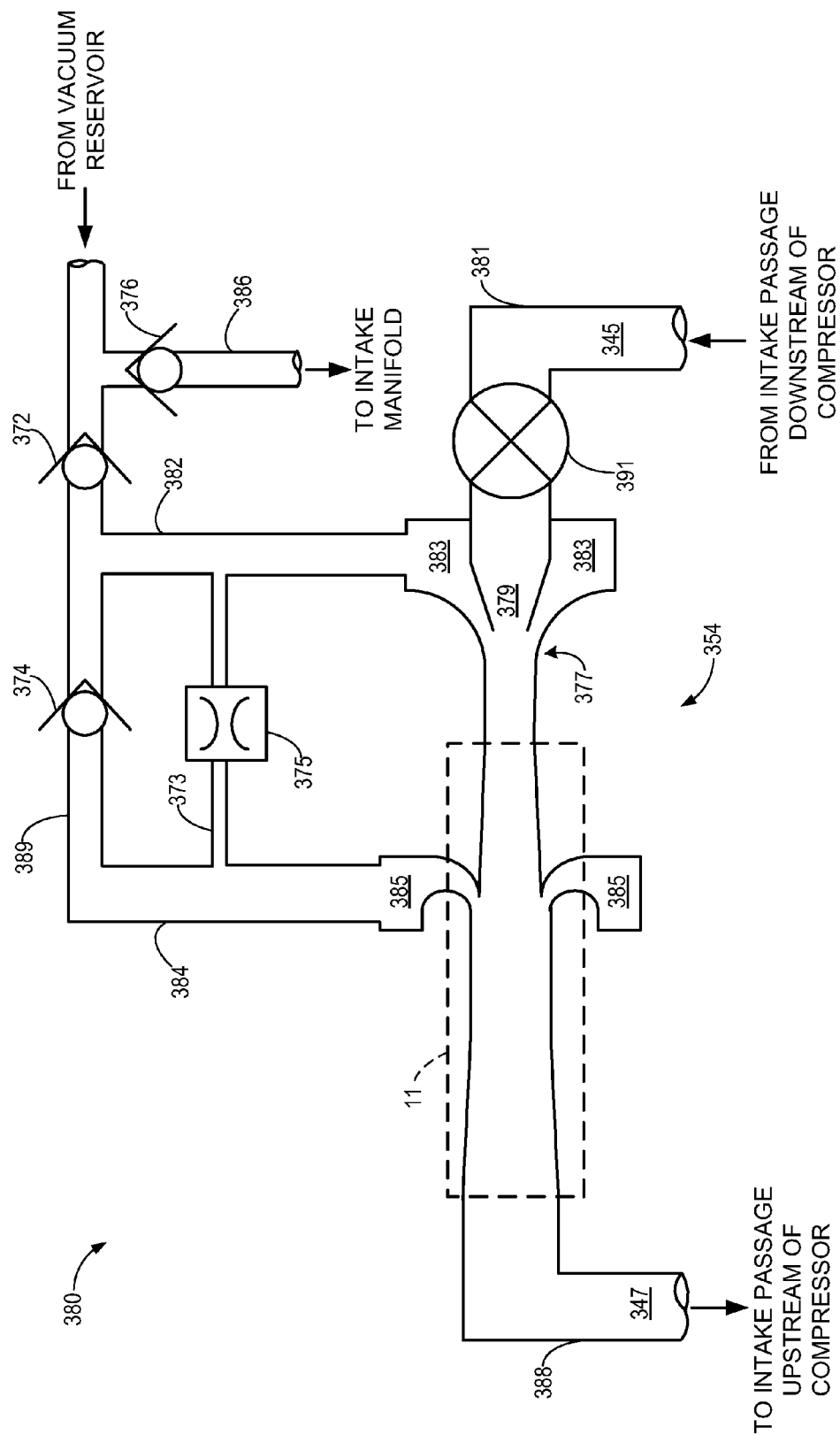
FIG. 4 shows a detail view of an aspirator arrangement which may be included in an engine system such as the engine system of the first embodiment.

A second embodiment of an engine system including a multiple tap aspirator is depicted in FIGS. 3-4. The second embodiment includes many of the same features described above for the first embodiment; similar features are numbered similarly and will not be described again for the sake of brevity. Further, it will be appreciated that various features among the two embodiments are usable together. For example, the aspirator arrangement of FIG. 3 may be configured in accordance with FIG. 2A or FIG. 2C rather than FIG. 4, or the aspirator arrangement of FIG. 1 may be configured in accordance with FIG. 4 rather than FIG. 2A or FIG. 2C, without departing from the scope of this disclosure. Furthermore, in the depicted second embodiment, diffuser 11 shown in FIG. 4 may correspond to diffuser 11 depicted in FIG. 2B or alternatively diffuser 11 depicted in FIG. 2D.

In contrast to the first embodiment, wherein the motive inlet of the aspirator arrangement fluidly communicates with the intake passage upstream of the compressor, the motive inlet 345 of aspirator arrangement 380 of FIG. 3 fluidly communicates with the intake passage downstream of the compressor and upstream of air intake throttle 322. While motive inlet 345 fluidly communicates with the intake passage upstream of charge air cooler 326, in other examples, motive inlet 345 may fluidly communicate with the intake passage downstream of charge air cooler 326 and upstream of throttle 322. Further, whereas the mixed flow outlet of the aspirator arrangement of the first embodiment fluidly communicates with the intake manifold, the mixed flow outlet 347 of aspirator arrangement 380 of FIG. 3 fluidly communicates with the intake passage upstream of compressor 390, and downstream of an air induction system (AIS) throttle 331 which is arranged downstream of air filter 333 in the depicted example.

Accordingly, as shown, aspirator arrangement 380 is arranged in parallel with bypass passage 328 which is coupled across compressor 390 so as to divert at least a portion of intake air compressed by compressor 390 back upstream of the compressor (via control of CBV 330, as discussed above for bypass passage 28 and CBV 30 of FIG. 1). As shown, bypass passage 28 may couple passages 381 and 388, and check valve 395 may be arranged downstream of a juncture of bypass passage 28 and passage 381 to prevent backflow from upstream of the compressor to downstream of the compressor via one or more of bypass passage 28 and the aspirator arrangement during conditions where pressure upstream of the compressor is greater than pressure downstream of the compressor (e.g., during non-boost conditions).

In the embodiment of FIG. 3, a compressor outlet pressure (COP) sensor 343 is arranged in intake passage 318, downstream of the compressor and upstream of the charge air cooler. COP sensor 343 may provide a signal regarding COP to controller 50. In other examples, the COP sensor may be omitted, and the pressure at the compressor outlet may be estimated or inferred based on other signals such as one or more of MAF sensed by sensor 358, intake throttle position, MAP, etc.

A position of AIS throttle 331 may be varied by controller 50 via a signal provided to an electric motor or actuator included with the AIS throttle 331. In this manner, AIS throttle 331 may be operated to vary the pressure in the intake passage at the compressor inlet, which in turn may vary a flow rate of compressor recirculation flow in bypass passage 328 when CBV 330 is at least partially open. Similarly, when AIS throttle 331 is operated to vary the pressure in the intake passage at the compressor inlet, this may vary motive flow through aspirator arrangement 380 during conditions where ASOV 391 is at least partially open. For example, increasing closing of AIS throttle 331 may cause reduction in pressure (e.g., increased vacuum) in a region of the intake passage intermediate the AIS throttle and the compressor inlet. Depending on the states of ASOV 391 and CBV 330, the reduction in pressure may increase motive flow through aspirator arrangement 380 and/or bypass passage 328. In other examples, however, there may be no AIS throttle; instead, flow through aspirator arrangement 380 may be regulated via control of the ASOV alone, and/or flow through bypass passage 328 may be regulated via control of the CBV alone.

Another difference between the first embodiment and the second embodiment involves the suction flow sources for aspirator arrangement 380. In the first embodiment, the suction passages for the throat tap and exit tube tap merge into a common passage which is coupled with vacuum reservoir 38 for use by vacuum actuators 39, whereas the suction passage for the diffuser tap is coupled with fuel vapor purge system 71. In contrast, as shown in FIG. 4, in the second embodiment, the throat and diffuser tap suction passages merge into a common passage 389 which is coupled with vacuum reservoir 338 for use by vacuum actuators 339, and there is no exit tube suction tap. Instead of an exit tube suction tap, a bypass passage 386 is coupled with vacuum reservoir 338 via common passage 389; specifically, bypass passage 386 communicates with common passage 389 downstream of vacuum reservoir 338 and upstream of check valve 372 (where "upstream" and "downstream" are in relation to the direction of suction flow originating from the vacuum reservoir and entering common passage 389). Bypass passage 386 is also coupled with the intake manifold. A check valve 376 arranged in bypass passage 386 may allow air to flow to the intake manifold from vacuum reservoir 338, and may limit air flow to vacuum reservoir 338 from the intake manifold. During conditions where the intake manifold pressure is negative (e.g., when vacuum is deeper than 0.1 bar), the intake manifold may be a vacuum source for vacuum reservoir 338. In examples where vacuum consumption device 339 is a brake booster, the intake manifold may achieve a deep vacuum when a driver's foot is removed from the accelerator pedal. Thus, inclusion of passage 393 in the system may serve to prepare the brake booster as the driver's foot is being released from the accelerator pedal, in that it may advantageously provide a bypass path which may ensure that the brake booster is evacuated nearly instantaneously whenever intake manifold pressure is lower than brake booster pressure. As will be described below, the system of FIGS. 3 and 4 may enable vacuum generation during boost conditions, and may also improve compressor surge mitigation during low-speed boost conditions.

Further, whereas check valves 72 and 74 are arranged in passages 82 and 84, respectively, in the first embodiment, check valves 372 and 374 of the second embodiment are both arranged in common passage 389. As shown in FIG. 4, suction passage 384 continues as common passage 389 downstream of a juncture of suction passage 384 with leak passage 373. Check valve 374 is arranged in a portion of suction passage 384/common passage 389 intermediate the juncture of suction passage 384 with leak passage 373 and a juncture of suction passage 382 with common passage 389. Check valve 372 is arranged in a portion of common passage 389 intermediate the juncture of suction passage 382 with common passage 389 and a juncture of bypass passage 386 with common passage 389. Accordingly, check valve 374 and leak passage 373 form what may be referred to as a "leaky check valve" which allows some backflow from suction tap 385 around check valve 374 via leak passage 373, for example during conditions where the pressure of suction flow is relatively low. Depending on relative pressures within aspirator arrangement 380, this backflow may then enter throat suction tap 383. However, the backflow will not enter the suction flow source (e.g., the vacuum reservoir in this embodiment), due to the presence of check valve 372 in common passage 389 upstream of the juncture of suction passage 382 with common passage 389. The controlled leak in check valve 374 may produce an effect similar to that of bleed-gap or hybrid diffusers wherein the low-velocity boundary layer is sucked out of the diffuser, pulling the high-velocity flow near the wall and advantageously decreasing the likelihood of flow separation.

Figure 10A:
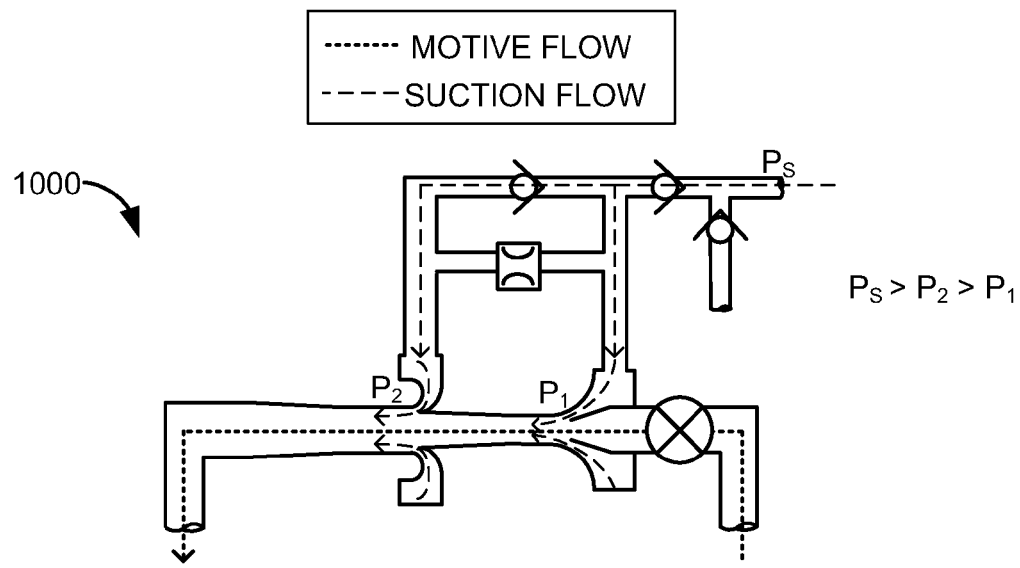
FIG. 10A depicts motive and suction flows through an aspirator arrangement which may correspond to the aspirator arrangement of FIGS. 3-4 during a first condition.
Figure 10B:
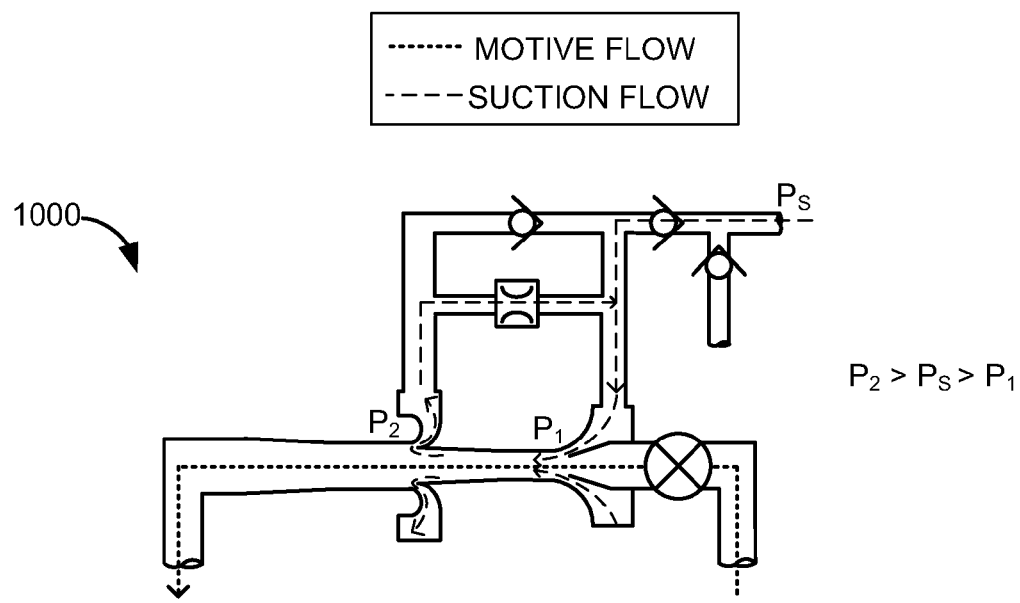
FIG. 10B depicts motive and suction flows through an aspirator arrangement which may correspond to the aspirator arrangement of FIGS. 3-4 during a second condition.

Turning to FIGS. 10A-B, they depict an aspirator arrangement 1000 which may correspond to aspirator arrangement 380 of the second embodiment. These figures depict suction and motive flow through aspirator arrangement 1000 for different system pressure levels when the ASOV is open, and when at least some compressor recirculation flow is traveling through the aspirator (e.g., when CIP is less than COP).

FIG. 10A depicts suction and motive flow through aspirator arrangement 1000 during engine operating conditions wherein the pressure $P_S$ at the suction flow source of the throat and diffuser taps (e.g., the pressure at the vacuum reservoir in the second embodiment) is greater than the pressure $P_2$ at the diffuser tap is greater than the pressure, and wherein $P_2$ is greater than the pressure $P_1$ at the throat tap. As noted above with respect to FIGS. 9A-B, $P_2$ may typically be greater than $P_1$ due to the geometry of the aspirator. During these conditions, as shown, suction flow from the vacuum reservoir may enter the throat tap and the diffuser tap. Although $P_2$ is greater than $P_1$, the nozzle in the throat (e.g., nozzle 379 of FIG. 4) may restrict flow into the throat to such an extent that suction flow in the passage coupled with the diffuser tap is not diverted into the throat tap via the leak passage. Further, during these conditions, backflow does not occur from the diffuser tap into the throat tap via the leak passage because $P_S$ is greater than $P_2$. While not depicted in FIG. 10A, it will be appreciated that fluid may also flow from the vacuum reservoir into a passage coupling the vacuum reservoir with the intake manifold (e.g., passage 386 of FIG. 4) during these conditions depending on the pressure differential between the vacuum reservoir and the intake manifold.

In contrast, FIG. 10B depicts suction and motive flow through aspirator arrangement 1000 during engine operating conditions wherein the pressure $P_2$ at the diffuser tap is greater than the pressure $P_S$ at the suction flow source of the throat and diffuser taps (e.g., the pressure at the vacuum reservoir in the second embodiment), and wherein $P_S$ is greater than the pressure $P_1$ at the throat tap. As indicated, due to the geometry of the aspirator, $P_1$ may be less than $P_2$.

During these conditions, as shown, suction flow from the vacuum reservoir may enter the throat tap. However, because $P_2$ is greater than $P_S$, the check valve arranged between the throat tap suction passage and the diffuser tap suction passage closes, such that suction flow from the vacuum reservoir cannot enter the diffuser tap via the suction passage coupled with the diffuser tap. Meanwhile, as shown, a low-velocity boundary layer of the motive flow may be sucked out of the diffuser at the diffuser tap, for example because $P_1$ is less than $P_2$. After being sucked out of the diffuser at the diffuser tap, the flow enters the suction passage coupled to the diffuser, then flows into the leak passage, and then into the throat tap of the aspirator, as shown. As noted above with respect to FIG. 9B, the sucking out of the low-velocity boundary layer may advantageously result in high-velocity motive flow being pulled near the wall of the aspirator which may in turn decrease the likelihood of flow separation in the region of the diffuser tap.

While not depicted in FIG. 10B, it will be appreciated that fluid may also flow from the vacuum reservoir into the exit tube tap during these conditions depending on the pressure differential between the vacuum reservoir and the intake manifold.

In one example, an engine system in accordance with the second embodiment may comprise an aspirator bypassing a compressor, a vacuum source coupled with throat and diffuser taps of the aspirator via respective first and second passages merging into a common passage downstream of the vacuum source, the first and second passages coupled by a leak passage with a flow restriction, a first check valve arranged in the common passage, and a second check valve arranged in the second passage upstream of the leak passage. As shown in FIGS. 2B and 4, for example, an exit of the diffuser tap may narrow as it approaches the diffuser, and the diffuser may comprise a first diverging section upstream of the diffuser tap, a second constant-diameter section contiguous with a downstream side of the first section, and a third diverging section contiguous with a downstream side of the second section. The second constant-diameter portion is contiguous with a downstream side of the diffuser tap and ends at a point where it meets an angle of the first diverging portion. As may be seen in FIG. 4, for example, the throat tap and a nozzle of the aspirator may together form a converging annular suction flow path into the throat of the aspirator. Further, as shown in FIG. 3, a compressor bypass passage may be arranged in parallel with the aspirator, and a CBV may be arranged in the compressor bypass passage while an aspirator shut-off valve may be arranged upstream of and in series with the aspirator.

As noted above, while a motive inlet of the aspirator is coupled with an engine intake passage downstream of the compressor and a mixed flow outlet of the aspirator is coupled with the intake passage upstream of the compressor and downstream of the AIS throttle in the example engine system shown in FIG. 3, it is contemplated that many of the features of the engine system and aspirator arrangement of FIG. 3 may be included in the engine system of the first embodiment. For example, in a contemplated modification of the engine system of FIG. 1 wherein both the diffuser and throat taps are coupled with a common vacuum source (e.g., the vacuum reservoir), a motive inlet of the aspirator may be coupled with the intake passage upstream of the compressor and a mixed flow outlet of the aspirator may be coupled with the intake manifold.

Figure 5:
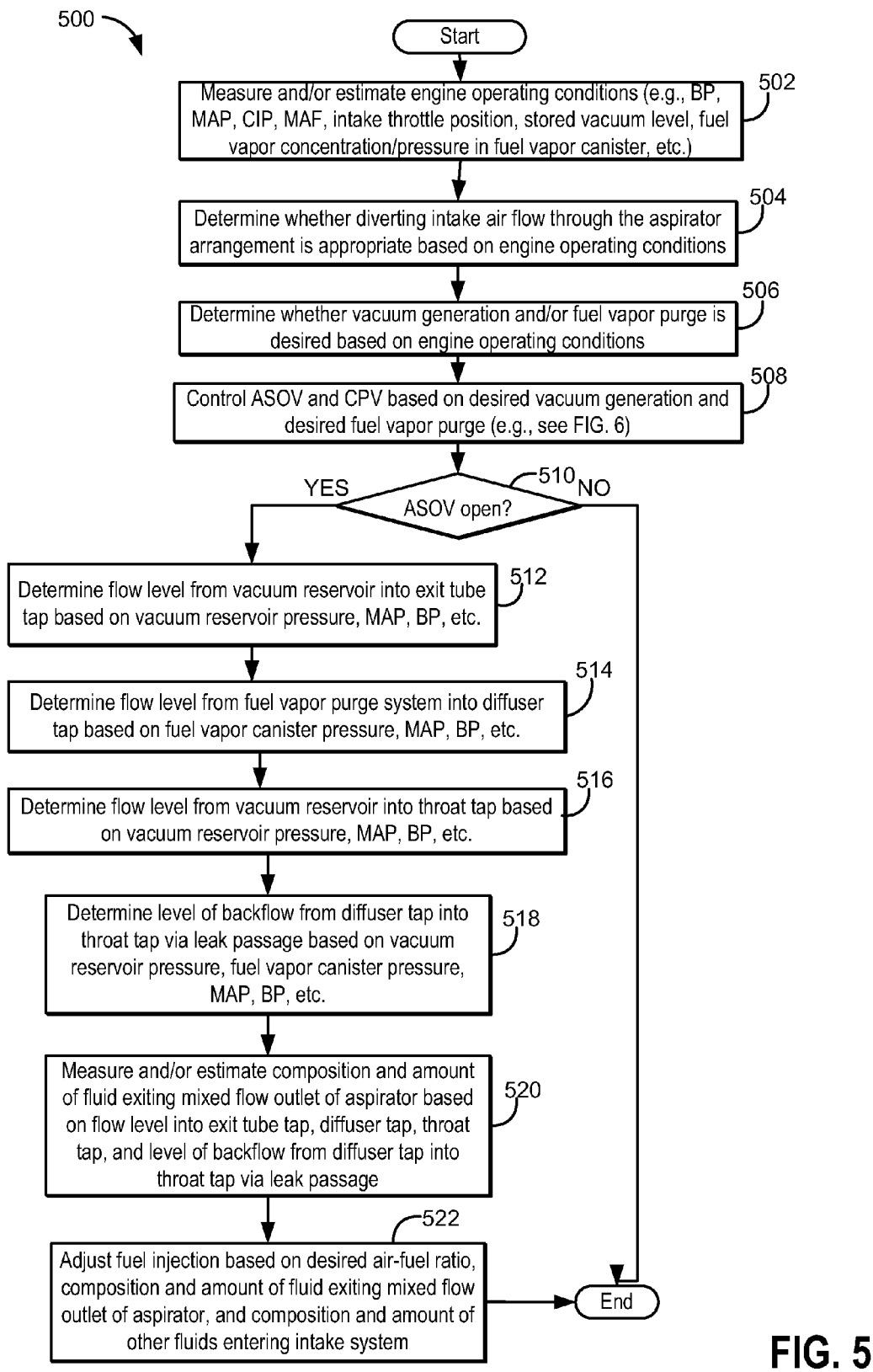
FIG. 5 shows an example method for controlling an engine system such as the engine system of the first embodiment.

Now referring to FIG. 5, an example method 500 for controlling an engine system including an aspirator arrangement such as aspirator arrangement 80 of the first embodiment. Method 500 may be used in conjunction with method 600 shown in FIG. 6, for example.

At 502, method 500 includes measuring and/or estimating engine operating conditions. In the context of method 500, engine operating conditions may include, for example, BP, MAP, CIP, MAF, intake throttle position, stored vacuum level (e.g., in the vacuum reservoir), engine speed, engine temperature, catalyst temperature, boost level, ambient conditions (temperature, humidity.), fuel vapor concentration/pressure in the fuel vapor canister, etc.

After 502, method 500 proceeds to 504. At 504, method 500 includes determining whether diverting intake air flow through the aspirator arrangement is appropriate based on engine operating conditions. For example, in the first embodiment, diverting intake air flow through the aspirator arrangement may be appropriate when BP is greater than MAP, but may not be appropriate when BP is less than MAP. Further, diverting intake air flow through the aspirator arrangement may not be appropriate when MAF is greater than a threshold (e.g., during high engine speed/load conditions when high MAF to the engine is desired). Accordingly, the determination of whether diverting intake air flow through the aspirator arrangement is appropriate may be based on BP, MAP, MAF, among other engine operating conditions.

After 504, method 500 proceeds to 506. At 506, method 500 includes determining whether vacuum generation and/or fuel vapor purge is desired based on engine operating conditions. For example, a determination of whether vacuum generation is desired may be made based on a level of stored vacuum in the vacuum reservoir (e.g., as sensed by a vacuum and/or pressure sensor in the vacuum reservoir) and/or based on vacuum requests from various engine vacuum consumers, and a determination of whether fuel vapor purge is desired may be made based on a signal provided to the controller from the pressure sensor in the fuel vapor canister.

After 506, method 500 proceeds to 508. At 508, method 500 includes controlling the ASOV and CPV based on the desired vacuum generation and desired fuel vapor purge determined at step 506. For example, the ASOV and CPV may be controlled in accordance with method 600 of FIG. 6.

After 508, method 500 proceeds to 510. At 510, the method includes determining whether the ASOV is open (e.g., whether the ASOV was controlled open or whether the ASOV was already opened and was not adjusted during the steps of method 600). If the answer at 510 is NO, method 500 ends, and no intake air is diverted through the aspirator arrangement. Otherwise, if the answer at 510 is YES, method 500 proceeds to 512.

At 512, method 500 includes determining the flow level from the vacuum reservoir into the exit tube tap of the aspirator based on vacuum reservoir pressure, MAP, BP, etc. It will be appreciated that the amount of suction flow into a given aspirator tap, if any, at a given time during engine operation may be a function of the level of motive flow through the aspirator, the geometry of the aspirator (e.g., the cross-sectional flow area of the aspirator and the various suction taps of the aspirator, the placement of the suction taps, the cross-sectional flow area of the suction passages coupled to the aspirator suction taps, and any other structural features of the aspirator affecting motive and suction flow), and the relative pressures at the source(s) and sink(s) of the suction passage coupled with the tap. For example, in the first embodiment when the ASOV is open, the exit tube tap is fluidly coupled with the intake passage upstream of the compressor, the intake manifold, and the vacuum reservoir, and thus the flow level into the exit tube tap from the vacuum reservoir may depend at least partially on the pressures at these parts of the engine (e.g. vacuum reservoir pressure, MAP, and BP).

After 512, method 500 proceeds to 514. At 514, method 500 includes determining the flow level from the fuel vapor purge system into the diffuser tap of the aspirator based on fuel vapor canister pressure, MAP, BP, etc. Step 514 may be performed similarly to step 512 described above. For example, in the first embodiment when the ASOV is open, the diffuser tap is fluidly coupled with the intake passage upstream of the compressor and the intake manifold. Depending on the state of the CPV, the diffuser tap may also be fluidly coupled with the fuel vapor canister during these conditions. Accordingly, the flow level into the diffuser tap from the fuel vapor purge system may depend at least partially on the pressures at these parts of the engine (e.g. fuel vapor canister pressure, MAP, and BP).

After 514, method 500 proceeds to 516. At 516, method 500 includes determining the flow level from the vacuum reservoir into the throat tap of the aspirator based on vacuum reservoir pressure, MAP, BP, etc. Step 516 may be performed similarly to steps 512 and 514 described above. For example, in the first embodiment when the ASOV is open, the throat tap is fluidly coupled with the intake passage upstream of the compressor, the intake manifold, and the vacuum reservoir, and thus the flow level into the throat tap from the vacuum reservoir may depend at least partially on the pressures at these parts of the engine (e.g. vacuum reservoir pressure, MAP, and BP).

After 516, method 500 proceeds to 518. At 518, method 500 includes determining the level of backflow from the diffuser tap into the throat tap via the leak passage based on vacuum reservoir pressure, fuel vapor canister pressure, MAP, BP, etc. As described above for FIG. 2A, in the context of the first embodiment, when the pressure at the diffuser tap is greater than the pressure at the outlet of the fuel vapor purge system (e.g., downstream of the CPV in passage 84), check valve 74 closes to prevent backflow from the aspirator to the fuel vapor purge system. However, because leak passage 73 is coupled with passage 84 on the diffuser tap side of the check valve, backflow of fluid from the aspirator's diffuser into passage 84, then into leak passage 73, and then into throat tap 83 may occur. Accordingly, the level of backflow may depend on vacuum reservoir pressure and pressure at the diffuser tap (which determine whether the check valve in passage 84 is open), as well as the relative pressures at the throat tap and diffuser tap (e.g., which may be functions of MAP and BP in the first embodiment), and the determination of the level of backflow may take into account these parameters, among other parameters.

After 518, method 500 proceeds to 520. At 520, method 500 includes measuring and/or estimating the composition and amount of fluid exiting the mixed flow outlet of the aspirator.

For example, the composition and amount of fluid exiting the mixed flow outlet of the aspirator may be estimated based on the flow levels in each suction tube of the aspirator determined at steps 512-516, the level of backflow determined at 518, and further based on parameter values detected by various sensors. In the context of the first embodiment, where suction flow entering the diffuser tap from the fuel vapor purge system includes some concentration of fuel vapors from the fuel vapor canister, the composition of the fluid exiting the mixed flow outlet of the aspirator may be based on the flow levels in the three taps and the level of backflow (as determined at 512-518, for example) and based on an inference of fuel vapor concentration exiting the fuel vapor canister during conditions where the CPV and check valve 74 are open. The inference may be based on sensed exhaust gas composition, for example. Alternatively, dedicated sensors may be arranged in the suction passage coupled to the diffuser tap or elsewhere to directly measure the fuel vapor concentration entering the intake manifold from the fuel vapor purge system via the diffuser tap.

After 520, method 500 proceeds to 522. At 522, method 500 includes adjusting fuel injection based a desired engine air-fuel ratio, the composition and amount of fluid exiting the mixed flow outlet of the aspirator (e.g., as determined at 520), and the composition and amount of any other fluids entering the intake system. For example, in embodiments where the flow exiting the mixed flow outlet of the aspirator includes fuel vapor purge gases, if the fuel vapor concentration of flow exiting the mixed flow outlet of the aspirator and entering the intake system would result in a greater than desired proportion of fuel in the engine cylinders, fuel injection may be adjusted (e.g., decreased via decrease in pulse width of fuel injection or frequency of fuel injection) to achieve a desired engine air-fuel ratio. After 522, method 500 ends.

In accordance with the method of FIG. 5, atmospheric air may be directed through an aspirator, the aspirator comprising a suction tap at a throat of the aspirator fluidly coupled, via a leak passage, with a suction tap at a diffuser of the aspirator, an exit of the diffuser tap narrowing as it approaches the diffuser, into an intake manifold of the engine based on desired vacuum generation. Directing atmospheric air through the aspirator may include controlling an aspirator shut-off valve arranged in series with the aspirator and a canister purge valve of a fuel vapor purge system coupled with the diffuser tap based on the desired vacuum generation and desired fuel vapor purge. Further, fuel injection to the engine may be adjusted based on a desired engine air-fuel ratio and based on the composition and amount of fluid entering the intake manifold from the aspirator, where the composition and amount of fluid entering the intake manifold from the aspirator may be determined based on a flow level from a vacuum reservoir into the throat tap, a flow level from the vacuum reservoir into a suction tap arranged at an exit tube of the aspirator downstream of the diffuser, a flow level from the fuel vapor purge system into the diffuser tap, and a level of backflow from the diffuser tap into the throat tap via the leak passage. As noted above, the level of backflow from the diffuser tap into the throat tap via the leak passage may be determined based on diffuser tap pressure, throat tap pressure, pressure in the vacuum reservoir, and pressure at an outlet of the fuel vapor purge system, in one example. As shown in FIGS. 1-2A, in the context of the first embodiment, to which method 500 is directed, a check valve is arranged in a passage coupling the diffuser tap with the outlet of the fuel vapor purge system. Further, it will be appreciated that no backflow from the diffuser tap into the throat tap via the leak passage occurs when the pressure at the diffuser tap is less than the pressure at the outlet of the fuel vapor purge system.

Figure 6:
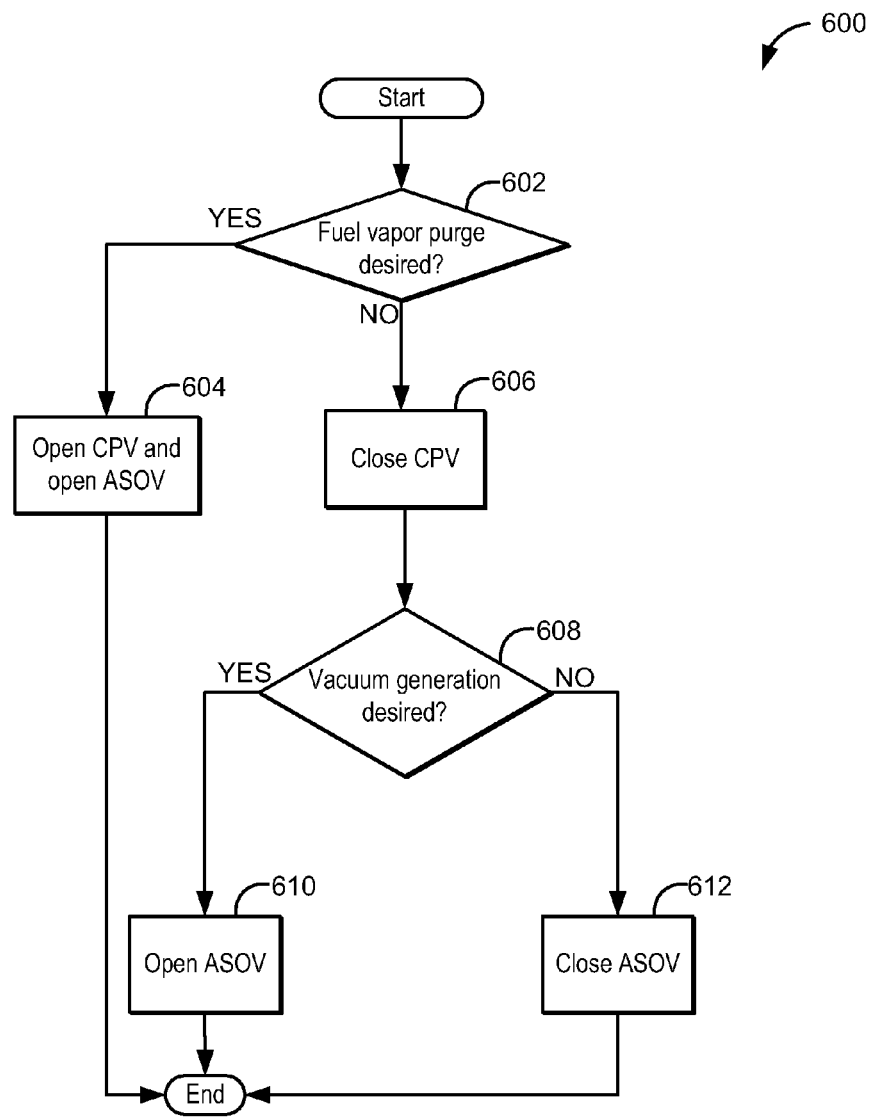
FIG. 6 shows an example method for controlling an ASOV and CPV of an engine system such as the engine system of the first embodiment, which may be performed in conjunction with the method of FIG. 5

In FIG. 6, an example method 600 is provided for controlling an ASOV of an aspirator arrangement such as aspirator arrangement 80 depicted in FIGS. 1 and 2A and controlling a CPV of a fuel vapor purge system such as CPV 65 of fuel vapor purge system 71 of FIG. 1. Method 600 may be used in conjunction with method 500 of FIG. 5 (e.g., method 600 may be performed at step 508 of method 500).

At 602, method 600 includes determining whether fuel vapor purge is desired. For example, whether fuel vapor purge is desired may be determined based on a signal provided to the controller from the pressure sensor in the fuel vapor canister. If the answer at 602 is YES, method 600 proceeds to 604. At 604, method 600 includes opening the ASOV (e.g., ASOV 91 of FIGS. 1 and 2A) and opening the CPV (e.g., CPV 65 of FIG. 1). As used herein, opening the ASOV may refer to partially or fully opening the ASOV. For example, an opening amount of the ASOV may be determined by the control system based on engine operating conditions and/or sensed parameter values. Similarly, as used herein, opening the CPV may refer to partially or fully opening the CPV, and an opening amount of the CPV may be determined by the control system based on engine operating conditions and/or sensed parameter values. After 604, method 600 ends.

Otherwise, if the answer at 602 is NO, method 600 proceeds to 606. At 606, method 600 includes closing the CPV (e.g., fully closing the CPV), such that the fuel vapor purge system is no fluidly communicating with the aspirator. After 606, method 600 proceeds to 608.

At 608, method 600 includes determining whether vacuum generation is desired. For example, whether vacuum generation is desired may be made based on a level of stored vacuum in the vacuum reservoir (e.g., as sensed by a vacuum and/or pressure sensor in the vacuum reservoir) and/or based on vacuum requests from various engine vacuum consumers.

If the answer at 608 is YES, method 600 proceeds to 610 to open the ASOV. As described above for step 604, this may include partially or fully opening the ASOV. By opening the ASOV when vacuum generation is desired, a portion of intake air may be diverted around the compressor and through the aspirator, and this motive flow through the aspirator may generate vacuum in the vacuum reservoir. After 610, method 600 ends.

Otherwise, if the answer at 608 is NO, method 600 proceeds to 612. At 612, method 600 includes closing the ASOV (e.g., fully closing the ASOV). Accordingly, during conditions where fuel vapor purge and vacuum generation are not desired, intake air may not be diverted from intake passage 18, and higher engine speed and load operation may be achievable. After 612, method 600 ends.

In accordance with the method of FIG. 6, if fuel vapor purge is desired, the control system may control actuators in order to open canister purge valve and the aspirator shut-off valve, whereas if fuel vapor purge is not desired but vacuum generation is desired, the control system may control actuators to close the canister purge valve and open the aspirator shut-off valve. In addition, the control system may control actuators to close the aspirator shut-off valve when intake manifold pressure exceeds atmospheric pressure, so as to avoid reverse flow through the aspirator arrangement. Alternatively, in some examples, reverse flow through the aspirator arrangement may be desired as it may result in vacuum generation, albeit less vacuum generation than may be achieved via forward flow through the aspirator arrangement.

Figure 7:
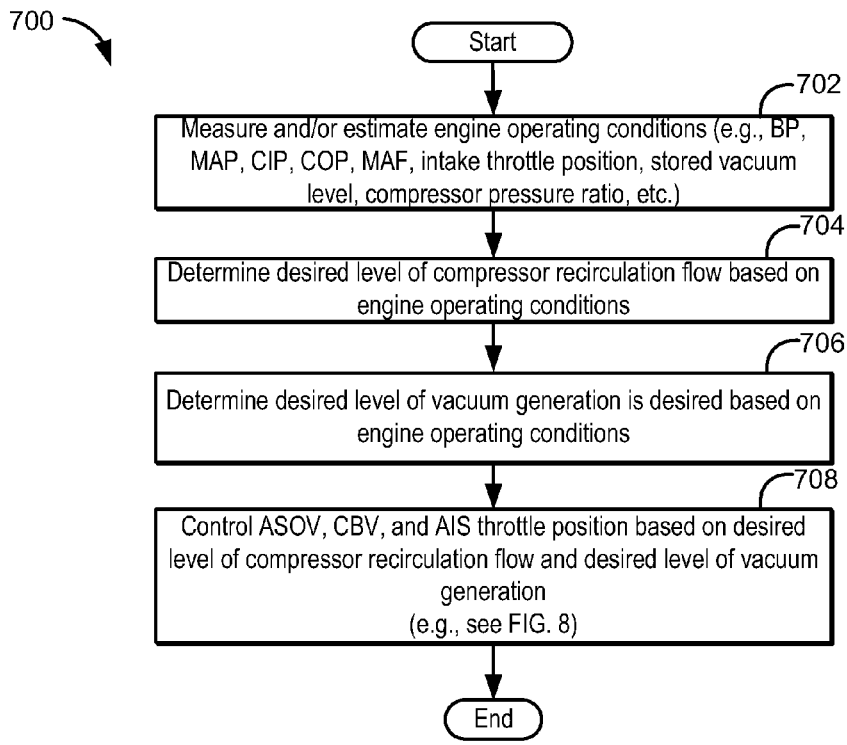
FIG. 7 shows an example method for controlling an engine system such as the engine system of the second embodiment.

In FIG. 7, an example method 700 is provided for controlling an ASOV, CBV, and AIS throttle to achieve a desired level of compressor recirculation flow and a desired level of vacuum generation in the context of the second embodiment depicted in FIGS. 3-4 herein. Method 700 may be used in conjunction with the method 800 of FIG. 8, for example.

At 702, method 700 includes measuring and/or estimating engine operating conditions. For example, in the context of engine system 310 of FIG. 3, engine operating conditions may include BP, MAP, CIP, COP, MAF, intake throttle position, stored vacuum level (e.g., in the vacuum reservoir), compressor pressure ratio, engine speed, engine temperature, catalyst temperature, boost level, ambient conditions (temperature, humidity), etc.

After 702, method 700 proceeds to 704. At 704, method 700 includes determining a desired level of compressor recirculation flow based on engine operating conditions. For example, the desired level of compressor recirculation flow may be based on compressor pressure ratio (e.g., as determined by controller 50 based on signals received from CIP sensor 341 and COP sensor 343), MAF, and intake throttle position. The desired level of compressor recirculation flow may be a level which reduces the likelihood of compressor surge while ensuring that airflow into the engine remains appropriate for current engine speed/load conditions. During non-boost conditions, for example, the desired level of compressor recirculation flow may be zero, whereas during boost conditions, the desired level of compressor recirculation flow may be greater than zero depending on the compressor pressure ratio, among other factors.

After 704, method 700 proceeds to 706. At 706, method 700 includes determined a desired level of vacuum generation based on engine operating conditions (e.g., the engine operating conditions measured and/or estimated at 702). This determination may be made based on a level of stored vacuum in the vacuum reservoir (e.g., as sensed by a vacuum and/or pressure sensor in the vacuum reservoir) and/or based on vacuum requests from various engine vacuum consumers, for example.

After 706, method proceeds to 708. At 708, method 700 includes controlling the ASOV, CBV, and AIS throttle position based on the desired compressor recirculation flow and the desired vacuum generation determined at steps 704 and 706, respectively. For example, step 708 may be performed in accordance with method 800 of FIG. 8, which will be described below. After 708, method 700 ends.

In accordance with the method of FIG. 7, intake air may be selectably recirculated from downstream of a compressor to upstream of the compressor through a bypass passage and an aspirator arrangement arranged in parallel with the bypass passage, the aspirator arrangement comprising a suction tap at a throat of an aspirator fluidly coupled, via a leak passage, with a suction tap at a diffuser of the aspirator, an exit of the diffuser tap narrowing as it approaches the diffuser, based on a desired level of vacuum generation and a desired level of compressor recirculation flow. The selective recirculation of intake air may be achieved by controlling an aspirator shut-off valve arranged in series with the aspirator and a compressor bypass valve arranged in the bypass passage based on the desired level of vacuum generation and the desired level of compressor recirculation flow, for example. Further, an air induction system throttle arranged in the intake passage upstream of a mixed flow outlet of the aspirator may be controlled based on the desired level of vacuum generation and the desired level of compressor recirculation flow.

Figure 8:
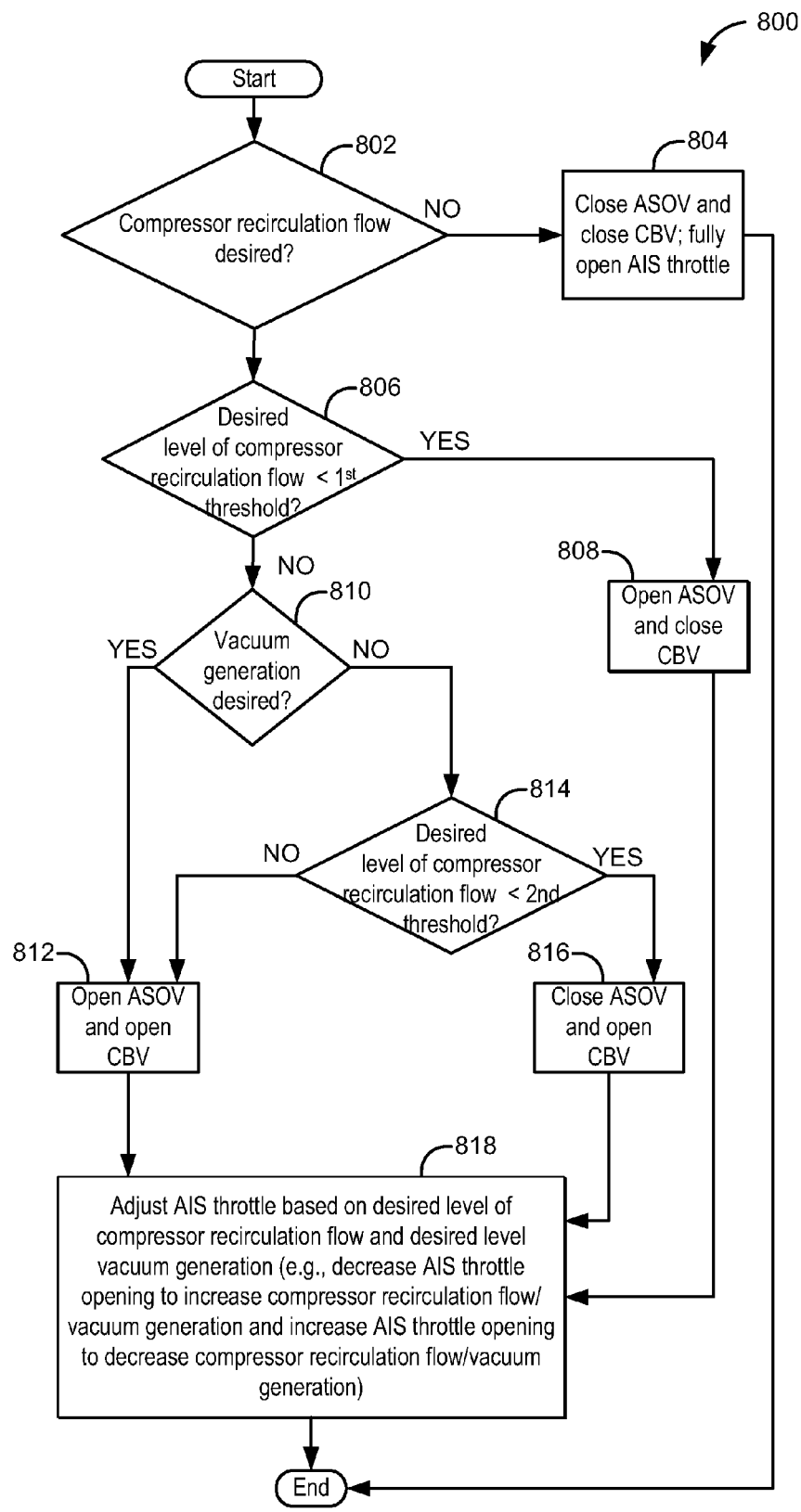
FIG. 8 shows an example method for controlling an ASOV, CBV, and AIS throttle of an engine system such as the engine system of the second embodiment, which may be performed in conjunction with the method of FIG. 8.

In FIG. 8, an example method 800 is provided for controlling an ASOV of an aspirator arrangement such as aspirator arrangement 380 depicted in FIGS. 3 and 4 and controlling a CBV such as CBV 328 of FIG. 3. Method 800 may be used in conjunction with method 700 of FIG. 7 (e.g., method 800 may be performed at step 708 of method 700).

At 802, method 800 includes determining whether compressor recirculation flow is desired. For example, if the desired level of compressor recirculation flow determined at step 704 of method 700 based on engine operating conditions is zero, compressor recirculation flow is not desired. Otherwise, if the desired level of compressor recirculation flow determined at step 704 of method 700 is greater than zero, this indicates that compressor recirculation flow is desired.

If the answer at 802 is NO, method 800 proceeds to 804. At 804, method 800 includes closing the ASOV (e.g., fully closing the ASOV) and closing the CBV (e.g., fully closing the CBV), such that intake air does not recirculate from downstream of the compressor to upstream of the compressor via passage 330 or via aspirator arrangement 380. Further, at 804, method 800 includes fully opening the AIS throttle, as pressure reduction in the intake passage downstream of the AIS throttle may not be needed when there is no compressor recirculation flow due to the closure of the ASOV and the CBV. After 804, method 800 ends.

Otherwise, if the answer at 802 is YES indicating that compressor recirculation flow is desired, method 800 proceeds to 806. At 806, method 800 includes determining whether the desired level of compressor recirculation flow (e.g., as determined at step 704 of method 700) is less than a first threshold. In one non-limiting example, the first threshold may correspond to a maximum compressor recirculation flow level achievable with the CBV closed and the ASOV open.

If the answer at 806 is YES, method 800 proceeds to 808 to open the ASOV and close the CBV. By opening the ASOV and closing the CBV, compressor recirculation flow may travel from downstream of the compressor to upstream of the compressor via aspirator arrangement 380, but not via passage 330. After 808, method 800 proceeds to 818, which will be described below.

Otherwise, if the answer at 806 is NO, method 800 proceeds to 810 to determine whether vacuum generation is desired. For example, if the desired level of vacuum generation determined at step 706 of method 700 based on engine operating conditions is zero, vacuum generation is not desired. Otherwise, if the desired level of vacuum generation determined at step 706 of method 700 is greater than zero, this indicates that vacuum generation is desired.

If the answer at 810 is YES, method 800 proceeds to 812 to open both the ASOV and the CBV. As described above for step 604, this may include partially or fully opening the ASOV and partially or fully opening the CBV. When vacuum generation is desired and the desired level of compressor recirculation flow is greater than the first threshold, opening both the ASOV and CBV may provide an appropriate level of compressor recirculation flow while also enabling vacuum generation in the vacuum reservoir via motive flow through the aspirator arrangement. For example, when both the ASOV and CBV are open, intake air may enter passage 388 downstream of the compressor before branching into two portions, a first portion flowing through passage 330 to passage 381 before reentering intake passage 318 upstream of the compressor, and a second portion providing motive flow through aspirator arrangement 380 before flowing into passage 381 and then back into intake passage 318 upstream of the compressor. After 812, method 800 proceeds to 818, which will be described below.

Otherwise, if the answer at 810 is NO, method 800 proceeds to 814. At 814, method 800 includes determining whether the desired level of compressor recirculation flow (e.g., as determined at step 704 of method 700) is less than a second threshold. In one non-limiting example, the second threshold may correspond to a maximum compressor recirculation flow level achievable with the ASOV closed and the CBV open.

If the answer at 814 is YES, method 800 proceeds to 816 to close the ASOV and open the CBV. In the context of the second embodiment, by closing the ASOV and opening the CBV, compressor recirculation flow may travel from downstream of the compressor to upstream of the compressor via passage 330 but not via aspirator arrangement 380. After 816, method 800 proceeds to 818, which will be described below.

Otherwise, if the answer at 814 is NO, method 800 proceeds to 812 to open the ASOV and the CBV. When the desired level of compressor recirculation flow is greater than the second threshold, it may be necessary to open both the ASOV and CBV to achieve the desired level of compressor recirculation flow. Thus, even when vacuum generation is not desired, intake air may be recirculated through the aspirator arrangement to supplement the recirculation flow through the compressor bypass passage, in order to achieve the desired level of compressor recirculation flow. After 812, method 800 proceeds to 818.

At 818, method 800 includes adjusting the AIS throttle based on the desired level of compressor recirculation flow and desired level of vacuum generation. In the context of the second embodiment, the mixed flow outlet of aspirator arrangement 380 and the outlet of passage 330 merge to form a passage 381 which communicates with the intake passage downstream of AIS throttle 331. Accordingly, adjustment of AIS throttle 331 affects the pressure in the intake passage at the juncture of the intake passage with passage 381, and thus affects the flow rate/level in passage 330 and in the aspirator arrangement. For example, adjusting the AIS throttle may include decreasing AIS throttle opening to increase compressor recirculation flow/vacuum generation, and increasing AIS throttle opening to decrease compressor recirculation flow/ vacuum generation. Thus, adjustment of the AIS throttle may provide additional flexibility in the level of compressor recirculation flow achievable in the engine system, in that for a given state of the ASOV and CBV, different flow levels may be achieved for different AIS throttle positions. After 818, method 800 ends.

In accordance with the method of FIG. 8, if the desired level of compressor recirculation flow is less than a first threshold, the control system may control actuators of the engine system to open the ASOV and close the CBV. However, if the desired level of compressor recirculation flow is greater than the first threshold and vacuum generation is desired, or if the desired level of compressor recirculation flow is greater than a second threshold and vacuum generation is not desired, the control system may control actuators of the engine system to open the aspirator shut-off valve and the compressor bypass valve. Further, if the desired level of compressor recirculation flow is greater than the first threshold and less than the second threshold and vacuum generation is not desired, the control system may control actuators of the engine system to close the ASOV and open the CBV. Furthermore, if compressor recirculation flow is not desired, the control system may control actuators of the engine system to close the ASOV and CBV, and to fully open the AIS throttle. As noted above, in the context of the method of FIG. 8, the desired level of compressor recirculation flow may be based on a compressor pressure ratio and the desired level of vacuum generation may be based on a level of stored vacuum in a vacuum reservoir coupled with the throat tap and the diffuser tap.

In another representation, an aspirator arrangement for an engine system comprises a nozzle of an aspirator which converges in a motive flow direction into a throat of the aspirator, a diffuser connected to the throat, a first suction tap in the throat, and a second suction tap in the diffuser, the first and second taps coupled with a vacuum source via respective first and second passages which merge into a common passage downstream of the vacuum source. A check valve may be arranged in the second passage, and a leak passage may be coupled to the second passage upstream and downstream of the check valve. In one example, the diffuser comprises a first diverging section upstream of the second tap, a second constant-diameter section beginning at the downstream side of the second tap, and a third diverging section downstream of the second section. In this example, an axis of the second passage at a juncture of the second passage and the diffuser may be substantially parallel to an axis of the diffuser, such that a path of suction flow into the aspirator via the diffuser tap is substantially parallel to an axis of the diffuser. Alternatively, in another example, the diffuser may have a diverging flow geometry along its entire length, and suction flow may enter the aspirator via the diffuser tap at an angle of approximately 45 degrees from an axis of the diffuser. There may be no check valve arranged in the first passage in these examples.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for an engine, comprising:
selectably recirculating intake air from downstream of a compressor to upstream of the compressor through a bypass passage and an aspirator arrangement arranged in parallel with the bypass passage, the aspirator arrangement comprising a suction tap at a throat of an aspirator fluidly coupled via a leak passage with a suction tap at a diffuser of the aspirator, an exit of the suction tap at the diffuser narrowing as it approaches the diffuser, wherein the selectably recirculating intake air is based on a desired level of vacuum generation and a desired level of compressor recirculation flow.

2. The method of claim 1, further comprising selectably recirculating intake air from downstream of the compressor to upstream of the compressor by controlling an aspirator shut-off valve arranged in series with the aspirator and a compressor bypass valve arranged in the bypass passage based on the desired level of vacuum generation and the desired level of compressor recirculation flow.

3. The method of claim 2, further comprising controlling an air induction system throttle arranged in an intake passage upstream of a mixed flow outlet of the aspirator based on the desired level of vacuum generation and the desired level of compressor recirculation flow.

4. The method of claim 3, further comprising:
if the desired level of compressor recirculation flow is less than a first threshold, opening the aspirator shut-off valve and closing the compressor bypass valve;
if the desired level of compressor recirculation flow is greater than the first threshold and vacuum generation is desired, or if the desired level of compressor recirculation flow is greater than a second threshold and vacuum generation is not desired, opening the aspirator shut-off valve and the compressor bypass valve; and
if the desired level of compressor recirculation flow is greater than the first threshold and less than the second threshold and vacuum generation is not desired, closing the aspirator shut-off valve and opening the compressor bypass valve.

5. The method of claim 4, further comprising, if compressor recirculation flow is not desired, closing the aspirator shut-off valve and the compressor bypass valve and fully opening the air induction system throttle.

6. The method of claim 1, wherein the desired level of compressor recirculation flow is based on a compressor pressure ratio and wherein the desired level of vacuum generation is based on a level of stored vacuum in a vacuum reservoir coupled with the suction tap at the throat and the suction tap at the diffuser.

* * * * *